(12) United States Patent
Buchanan

(10) Patent No.: US 8,985,065 B2
(45) Date of Patent: Mar. 24, 2015

(54) INTERNAL COMBUSTION ENGINES

(75) Inventor: Nigel Alexander Buchanan, By Leven (GB)

(73) Assignees: Ian Kurt Rosen, North Muskegon, MI (US); Nigel A. Buchanan, Fife (GB)

( * ) Notice: Subject to any disclaimer, the term of this patent is extended or adjusted under 35 U.S.C. 154(b) by 53 days.

(21) Appl. No.: 12/864,812

(22) PCT Filed: Feb. 13, 2009

(86) PCT No.: PCT/GB2009/000407
§ 371 (c)(1),
(2), (4) Date: Jul. 27, 2010

(87) PCT Pub. No.: WO2009/101420
PCT Pub. Date: Aug. 20, 2009

(65) Prior Publication Data
US 2010/0307431 A1   Dec. 9, 2010

(30) Foreign Application Priority Data

Feb. 13, 2008 (GB) .................................. 0802714.6
Jan. 7, 2009 (GB) .................................. 0900159.5

(51) Int. Cl.
*F02B 43/08* (2006.01)
*F01B 21/00* (2006.01)
(Continued)

(52) U.S. Cl.
CPC .................. *F01B 21/00* (2013.01); *F01K 15/02* (2013.01); *F01K 21/04* (2013.01)
USPC ................................................. 123/3; 123/19

(58) Field of Classification Search
USPC ....................... 123/1 R, 1 A, 3, DIG. 12, 2, 19
See application file for complete search history.

(56) References Cited

U.S. PATENT DOCUMENTS 1,336,392 A   4/1920   Smith
2,872,778 A   2/1959   Dane
(Continued)

FOREIGN PATENT DOCUMENTS

DE   590890     1/1934
DE   2612961    10/1977
(Continued)

OTHER PUBLICATIONS

International Search Report for PCT/GB2009/000407 dated Jul. 10, 2009.
(Continued)

*Primary Examiner* — Noah Kamen
*Assistant Examiner* — Long T Tran
(74) *Attorney, Agent, or Firm* — Gardner, Linn, Burkhart & Flory, LLP

(57) ABSTRACT

An internal combustion engine (10) comprises a chamber (12), inlet valving (24, 26) operable to admit constituents of a combustible mixture into the chamber for combustion in the chamber to provide a pressure increase in the chamber, outlet valving (16) operable to release an outflow of liquid from the chamber under the influence of that pressure increase as an energy output of the chamber, input valving (136) for selectively admitting a heated aqueous fluid into chamber and a supply system (130, 132, 134) for supplying heated aqueous fluid to the input valving. The input valving is arranged to admit the heated aqueous fluid into a region of the chamber in which combustion of the combustible mixture occurs such that at least a portion of the heated aqueous fluid will dissociate to provide hydrogen that is combusted in the chamber.

23 Claims, 25 Drawing Sheets

(51) Int. Cl.
*F01K 15/02* (2006.01)
*F01K 21/04* (2006.01)

(56) References Cited

U.S. PATENT DOCUMENTS

| | | | | |
|---|---|---|---|---|
| 3,361,353 | A * | 1/1968 | Millman | 239/5 |
| 3,608,660 | A * | 9/1971 | Smith et al. | 180/69.5 |
| 3,815,555 | A | 6/1974 | Tubeuf | |
| 3,946,711 | A * | 3/1976 | Wigal | 123/536 |
| 4,147,801 | A * | 4/1979 | Lenhard et al. | 514/577 |
| 4,148,701 | A * | 4/1979 | Leach | 204/157.5 |
| 4,380,970 | A * | 4/1983 | Davis | 123/3 |
| 4,508,064 | A * | 4/1985 | Watanabe | 123/1 A |
| 4,530,317 | A | 7/1985 | Schutten | |
| 4,777,801 | A | 10/1988 | Porter | |
| 5,088,452 | A * | 2/1992 | Iwaki et al. | 123/3 |
| 5,127,369 | A | 7/1992 | Goldshtik | |
| 5,156,114 | A | 10/1992 | Gunnerman | |
| 5,183,011 | A * | 2/1993 | Fujii et al. | 123/1 A |
| 5,237,964 | A * | 8/1993 | Tomoiu | 123/25 C |
| 5,305,714 | A * | 4/1994 | Sekiguchi et al. | 123/3 |
| 5,647,734 | A | 7/1997 | Milleron | |
| 5,713,202 | A | 2/1998 | Johnson | |
| 6,112,522 | A | 9/2000 | Wright | |
| 6,659,049 | B2 * | 12/2003 | Zagaja et al. | 123/3 |
| 7,191,738 | B2 * | 3/2007 | Shkolnik | 123/19 |
| 2003/0056510 | A1 * | 3/2003 | Ovshinsky et al. | 60/597 |
| 2005/0166869 | A1 | 8/2005 | Shkolnik | |
| 2006/0204799 | A1 * | 9/2006 | Ishikawa et al. | 429/19 |
| 2008/0202449 | A1 * | 8/2008 | Shimada et al. | 123/3 |
| 2008/0245318 | A1 * | 10/2008 | Kuroki et al. | 123/3 |
| 2009/0180939 | A1 * | 7/2009 | Hagen et al. | 422/194 |
| 2010/0183993 | A1 * | 7/2010 | McAlister | 431/254 |
| 2011/0005473 | A1 * | 1/2011 | Ishikawa et al. | 123/3 |

FOREIGN PATENT DOCUMENTS

| | | |
|---|---|---|
| DE | 19646754 | 5/1998 |
| FR | 1011313 | 6/1952 |
| FR | 2585769 | 2/1987 |
| GB | 16711 | 0/1904 |
| GB | 20934 | 0/1911 |
| GB | 1191130 | 5/1970 |
| GB | 1511863 | 5/1978 |
| NL | 1018858 | 3/2003 |
| RU | 2042844 | 8/1995 |
| WO | WO02/20959 | 3/2002 |

OTHER PUBLICATIONS

Written Opinion of the International Search Authority for PCT/GB2009/000407.
Search Report for GB0900159.5, Jul. 27, 2010.

\* cited by examiner

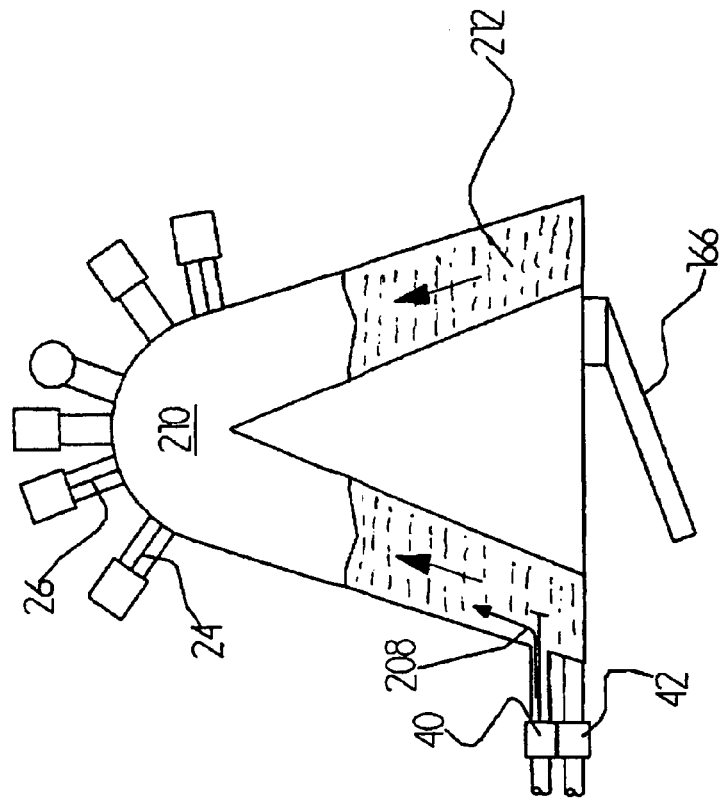
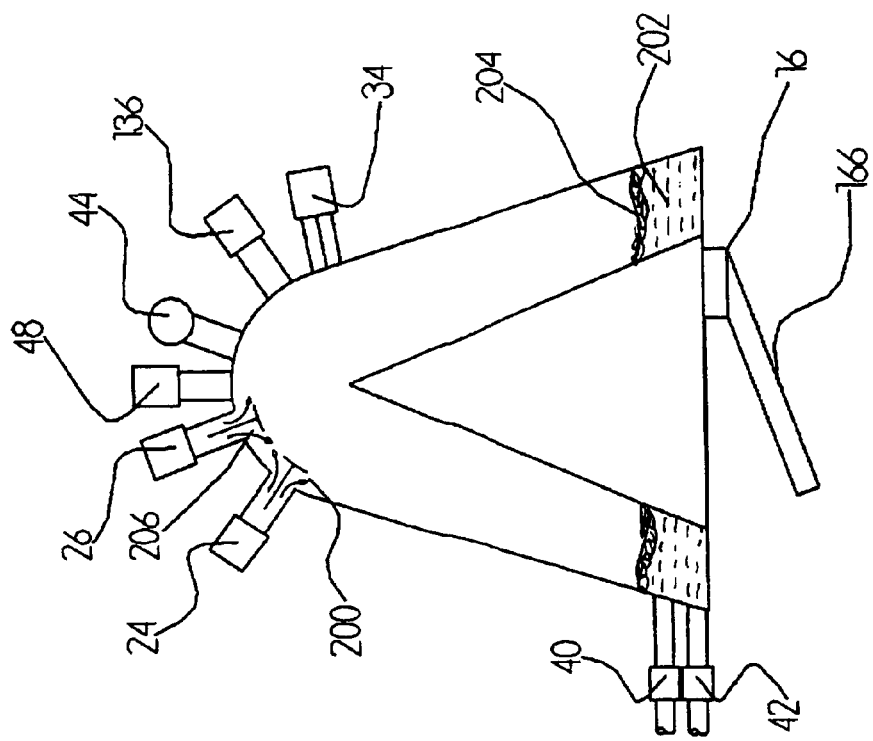

INTERNAL COMBUSTION ENGINES

CROSS-REFERENCE TO RELATED APPLICATIONS

This application is a U.S. National Stage of International Application No. PCT/GB2009/000407 filed Feb. 13, 2009, which claims priority to GB 0802714.6 filed Feb. 13, 2008 and GB 0900159.5, filed Jan. 7, 2009.

FIELD OF THE INVENTION

The invention relates to internal combustion engines and particularly, but not exclusively, to internal combustion engines for powering automotive vehicles.

BACKGROUND TO THE INVENTION

The reciprocating piston spark ignition engine is one known form of internal combustion engine used to power automotive vehicles. Reciprocating piston spark ignition engines comprise a number of pistons arranged to reciprocate in respective cylinders and each connected to a crankshaft. Each of the cylinders is provided with inlet valving for controlling the inflow of air and fuel, exhaust valving for controlling the exhaust of the products of combustion and a spark plug for igniting the air fuel mixture. Where the supply of fuel to the engine is controlled by a carburetor, the air and fuel are mixed in an intake manifold upstream of the cylinders and the inlet valving comprises an intake valve that controls the intake of the fuel-air mixture into the cylinder. If the fuel supply to the cylinders is by fuel injection, the inlet valving comprises two valves. One of the valves is a fuel injector and the other is an air intake valve. The fuel injector may be arranged to inject fuel directly into the cylinder or may inject it into an air intake duct just upstream of the air intake valve.

Typically, reciprocating spark ignition engines operate a four-stroke cycle. Each movement of a piston up or down its cylinder comprises one stroke of the four-stroke cycle. The four-stroke cycle consists of:

an induction stroke during which the inlet valving opens and air and fuel are taken into the engine as the piston moves towards the crankshaft;

a compression stroke during which the inlet and exhaust valving are closed and the air fuel mixture is compressed while the piston moves away from the crankshaft;

a power, or working, stroke during which the compressed mixture is ignited and the rapid expansion caused by combustion of the mixture forces the piston back towards the crankshaft; and an exhaust stroke during which the exhaust valving is open and the exhaust gases are forced out of the cylinder as the piston moves away from the crankshaft again.

Some reciprocating piston spark ignition engines operate a two-stroke cycle, which is a variant of the four-stroke cycle. Such engines are usually of smaller capacity than four-stroke engines and in terms of passenger vehicles tend to be used for two-wheeled vehicles. Two stroke engines use ports located along the side of the cylinder instead of valves. As the piston moves up and down the cylinder, the ports are covered and uncovered depending on where the piston is in the cylinder. In essence, in a two-stroke engine the induction and compression processes take place during the first stroke and the combustion and exhaust processes take place during the second stroke.

The reciprocating piston compression ignition internal combustion engine is another form of engine commonly used to power automotive vehicles. Reciprocating piston compression ignition engines use a fuel having a higher auto-ignition temperature than the fuels used by spark ignition engines and operate a modified version of the four-stroke cycle described above. Specifically, during the induction stroke air is drawn into the cylinder and that air is compressed to a high pressure and temperature during the compression stroke. Fuel is then injected directly into the cylinder (or into a mixing chamber that leads into the cylinder) and combustion takes place as the fuel mixes with the high temperature compressed air in the cylinder. Historically, reciprocating piston compression ignition engines were considered noisy and slow and in the automotive field were used mainly for trucks and other commercial vehicles such as buses. However in more recent times, high performance reciprocating piston compression ignition engines have been developed and now reciprocating piston compression ignition engines are commonly used in small passenger vehicles such as saloon cars (sedans).

The Wankel engine is another form of spark ignition engine that has been used to power automotive vehicles. The Wankel engine employs a four 'stroke' cycle similar to the four-stroke cycle employed by the reciprocating piston spark ignition internal combustion engine. However, instead of reciprocating pistons, the Wankel engine has a roughly triangular rotor that is mounted on an eccentric shaft for rotation in an approximately oval (epitrochoid-shaped) chamber. The 'four strokes' take place in the spaces between the rotor and the chamber wall.

A common feature of these known internal combustion engines is that the fuel air mixture is input to a chamber in which it is combusted so that the rapid expansion of the mixture caused by the combustion acts directly on a body (piston or rotor) that is connected to an output shaft so as to cause rotation of the shaft; the output of the engine being the rotation of the shaft.

SUMMARY OF THE INVENTION

The invention provides an internal combustion engine comprising a chamber, inlet valving operable to admit constituents of a combustible mixture into said chamber for combustion therein to provide a pressure increase in said chamber, outlet valving operable to release an outflow of liquid from said chamber under an influence of said pressure increase as an energy output of said chamber, input valving for selectively admitting a heated aqueous fluid to said chamber and a supply system for supplying heated aqueous fluid to said input valving, said input valving being arranged to admit said heated aqueous fluid into a region of said chamber in which combustion of said combustible mixture occurs such that at least a portion of said heated aqueous fluid will dissociate to provide hydrogen that is combusted in said chamber.

The invention also includes an internal combustion engine comprising a chamber, inlet valving operable to admit constituents of a combustible mixture into said chamber for combustion therein to provide a pressure increase in said chamber, outlet valving operable to release an outflow of liquid from said chamber under an influence of said pressure increase as an energy output of said chamber, input valving for admitting an aqueous fluid into said chamber and a control for said input valving, said control being arranged to control said input valving such that a supply of said aqueous fluid is admitted to said chamber subsequent to compression of at least one constituent of said combustible mixture in said chamber such that components of at least a portion of said aqueous fluid spray can dissociate to provide hydrogen that is combusted in said combustible mixture.

The invention also includes an internal combustion engine comprising a chamber, inlet valving operable to admit constituents of a combustible mixture into said chamber for combustion therein to provide a pressure increase in said chamber, outlet valving operable to release an outflow of liquid from said chamber under an influence of said pressure increase as an energy output from said chamber, input valving operable to admit an aqueous fluid into said chamber and a control that controls operation of said chamber such that sufficient hydrogen containing compound and water molecules are present in said chamber during combustion of said combustible mixture to obtain steam reformation of said hydrogen containing compound to separate hydrogen from said hydrogen containing compound which hydrogen is combusted in said combustible mixture.

The invention also includes a method of operating an internal combustion engine, said method comprising combusting a combustible mixture in a chamber to provide a pressure increase for driving a liquid from said chamber as an energy output of said chamber and providing an aqueous fluid in said chamber subsequent to compression of at least one constituent of said combustible mixture in said chamber such that said aqueous fluid is present in said combustible mixture during combustion thereof so that at least a portion of said aqueous fluid dissociates in said chamber to provide hydrogen that is combusted in said combustible mixture.

The invention also includes a method of operating an internal combustion engine, said method comprising combusting a combustible mixture in a chamber to provide a pressure increase for driving a liquid from said chamber as an energy output of said chamber and supplying a heated aqueous fluid into a region of said chamber in which combustion of said combustible mixture occurs such that during combustion of said combustible mixture at least a portion of said heated aqueous fluid dissociates to provide hydrogen that is combusted in said combustible mixture.

The invention also includes a method of operating an internal combustion engine, said method comprising combusting a combustible mixture in a chamber to provide a pressure increase for driving a liquid from said chamber as an energy output of said chamber and providing an amount of hydrogen containing compound and water molecules within said combustible mixture to promote steam reformation of at least a portion of said hydrogen containing compound during combustion of said combustible mixture to separate hydrogen from said hydrogen containing compound which hydrogen is combusted in said combustible mixture.

The invention also includes an internal combustion engine comprising a chamber, inlet valving operable to admit constituents of a combustible mixture into said chamber for combustion of said combustible mixture in said chamber to provide an expanding gaseous mass in said chamber, outlet valving operable to release an outflow of liquid from said chamber under an influence of said expanding gaseous mass as an energy output of said chamber and a fluid holder in said chamber, said fluid holder being disposed in a region of said chamber in which combustion of said combustible mixture takes place such that aqueous fluid held by said fluid holder is disposed within said expanding gaseous mass so that said aqueous fluid is heated in a process to provide hydrogen that is combusted in said chamber and there being at least one flowpath past said fluid holder for said expanding gaseous mass to permit said expanding gaseous mass to act on said liquid.

The invention also includes a method of operating an internal combustion engine, said method comprising combusting a combustible mixture in a chamber to provide an expanding gaseous mass for driving a liquid from said chamber as an energy output of said chamber and providing an aqueous fluid on at least one fluid holder located in said chamber at a position in which it will be within combusting combustible mixture during combustion of said combustible mixture so that said aqueous fluid is heated in a process to provide hydrogen for combustion in said chamber.

The invention also includes a internal combustion engine comprising a chamber, inlet valving operable to admit constituents of a combustible mixture into said chamber for combustion therein, outlet valving operable to release an outflow of liquid from said chamber as an energy output of said chamber and a control for controlling operation of said chamber such that combustion of said combustible mixture generates a first pressure increase in said chamber to initiate movement of said outflow of liquid and combustion of hydrogen separated from a hydrogen containing compound within said chamber during combustion of said combustible mixture generates a second pressure increase that acts on said outflow of liquid, said second pressure increase acting on liquid put in motion by said first pressure increase.

The invention also includes a method of operating an internal combustion engine, said method comprising combusting a combustible mixture in a chamber to provide a first pressure increase for driving a liquid from said chamber as an energy output of said chamber, separating hydrogen from a hydrogen containing compound in said chamber by providing said hydrogen containing compound in said combusting combustible mixture and combusting said hydrogen in said combusting combustible mixture to provide a second pressure increase that acts on said liquid being driven from said chamber.

The invention also includes an internal combustion engine comprising a chamber, inlet valving operable to admit constituents of a combustible mixture into said chamber for combustion therein to provide a pressure increase in said chamber, outlet valving operable to release an outflow of liquid from said chamber under an influence of said pressure increase as an energy output of said chamber, input valving for selectively admitting a heated aqueous fluid to said chamber and a supply system for supplying heated aqueous fluid to said input valving, said input valving being arranged to admit said heated aqueous fluid into a region of said chamber in which combustion of said combustible mixture occurs to promote a hydrogen separation process to provide hydrogen that is combusted in said chamber.

BRIEF DESCRIPTION OF THE DRAWINGS

In order that the invention may be well understood, some embodiments thereof, which are given by way of example only, will now be described with reference to the drawings in which:

FIG. 7 is a schematic illustration showing the internal combustion engine of FIG. 1 during an air and fuel intake process of an operating cycle;

FIG. 8 is a view corresponding to FIG. 7 showing the internal combustion engine during a compression process of the operating cycle;

DETAILED DESCRIPTION OF THE ILLUSTRATED EMBODIMENTS

Figure 1:
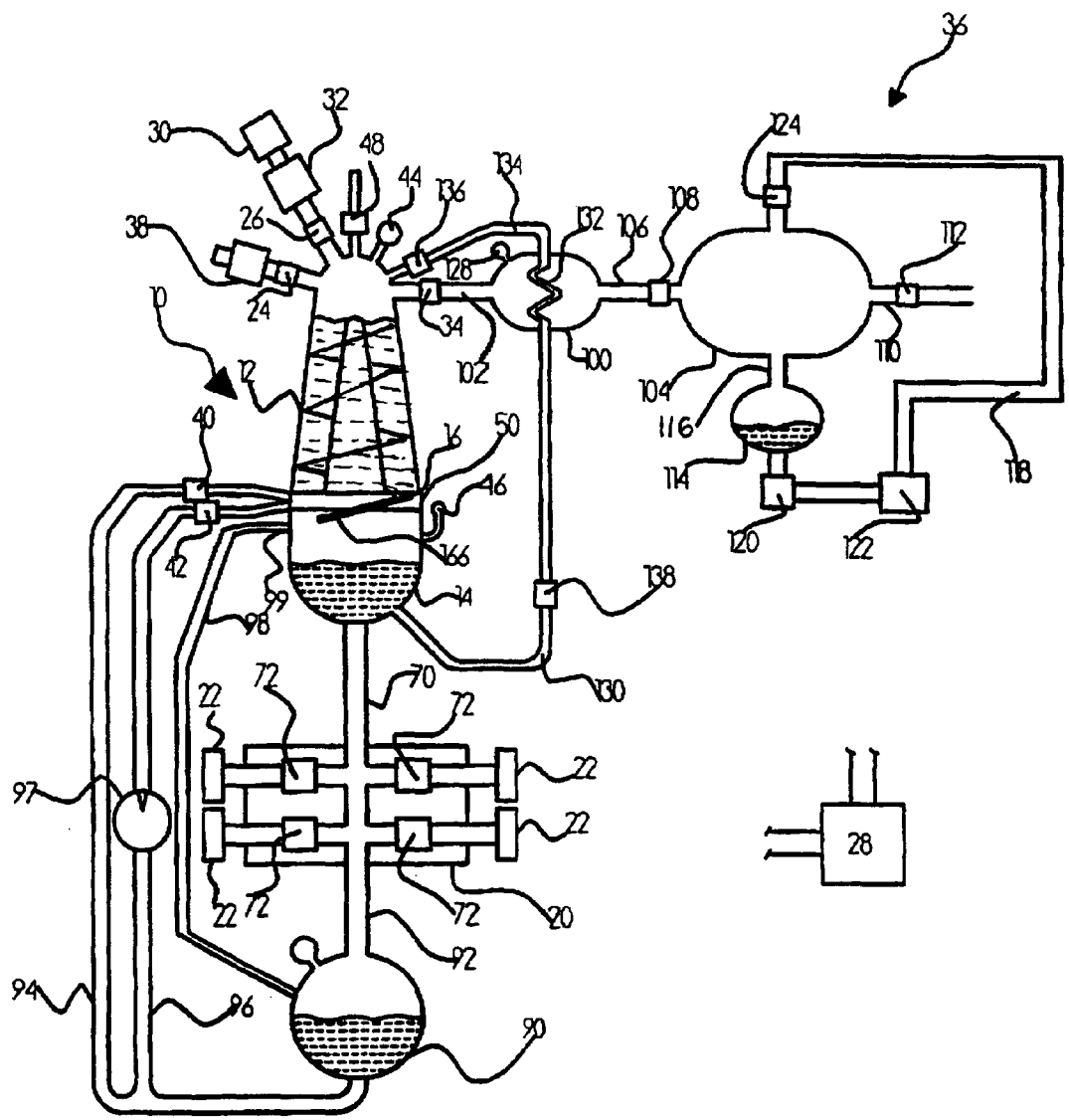
FIG. 1 is a schematic illustration of a single cylinder internal combustion engine connected to a motor vehicle drive train.

Referring to FIG. 1, an internal combustion engine 10 comprises a single combustion chamber in the form of a closed cylinder 12 that is connected with a first reservoir 14 via outlet valving 16. The cylinder 12 has an inlet end region at which constituents of a combustible mixture are selectively admitted to the cylinder and an outlet end region, which is where the outlet valving 16 is located. The combustible mixture is combusted in the cylinder 12 to produce pressure increases in the cylinder and the outlet valving 16 is operable to release an outflow of liquid from the cylinder under the influence of those pressure increases as the main energy output of the cylinder.

The first reservoir 14 is disposed generally below the cylinder 12 at the outlet end region of the cylinder to receive the outflow of energised liquid and stores the energy output until required. The liquid stored in the first reservoir 14 is supplied on demand to a drive unit 20 of a motor vehicle drive train. The drive unit 20 converts the energy stored in the first reservoir 14 into a drive force used to turn the four wheels 22 of an automotive vehicle (not shown).

The internal combustion engine 10 includes inlet valving 24, 26 associated with the cylinder 12 and operable to admit the constituents of the combustible mixture into the cylinder. In this embodiment, the inlet valving 24, 26 is for separately controlling the input of fuel and air into the cylinder 12 and comprises a normally closed solenoid actuated air intake valve 24 for controlling the flow of aspirant air into the cylinder and an electrically actuated fuel injector 26 through which fuel is injected directly into the cylinder. The operation of the air intake valve 24 and fuel injector 26 is controlled by a control system that includes a microprocessor based control unit 28. The fuel injector 26 is connected to a fuel reservoir 30 via a fuel pump 32.

In order to make the drawings more intelligible, the connections between the control unit 28 and the parts it controls and/or receives signals from are not shown.

The internal combustion engine 10 also includes exhaust valving 34 associated with the cylinder 12. The exhaust valving is in the form of a normally closed solenoid actuated exhaust valve 34. Operation of the exhaust valve 34 is controlled by the control unit 28. The control unit 28 provides signals to the exhaust valve 34 to cause selective opening of the valve to allow the products of combustion (exhaust gases) to be exhausted from the cylinder 12 to an exhaust system 36. The exhaust system 36 is described in more detail below.

The air intake valve 24 is in flow communication with an air intake system 38 that may comprise one or more air filters and suitable ducting and/or one or more air intake manifolds through which aspirant air is supplied to the cylinder 12 via the air intake valve. Although not essential, the intake air may be pressurised by turbo charging or supercharging. Supercharging and turbo charging are both techniques that will be familiar to those in skilled in the art and so will not be described in detail herein.

The internal combustion engine 10 also includes fluid admission control valving in the form of a normally closed solenoid actuated fluid admission control valve 40 and a normally closed solenoid actuated start up admission control valve 42. Both fluid admission control valves 40, 42 are arranged for controlling the admission to the cylinder 12 of the liquid that is to be energised by a combustion process prior to output to the first reservoir 14. Operation of the fluid admission control valves 40, 42 is controlled by the control unit 28.

In addition to the control unit 28, the control system for the internal combustion engine 10 includes a sensor 44 that is arranged to output signals indicative of the pressure within the cylinder 12. Any suitable sensor may be used. Since the temperature in the cylinder 12 will closely follow the pressure, the sensor may be a temperature sensor 44 such as a thermocouple positioned with its temperature sensing portion within the cylinder 12.

The control system for the internal combustion engine 10 also includes a sensor 46 arranged to provide the control unit 28 with signals indicative of the pressure in the first reservoir 14. The sensor 46 can be any suitable sensor, including a temperature sensor. As the demand on the internal combustion engine 10 varies, the pressure in the first reservoir 14 will vary as more or less of the stored liquid is demanded by the drive unit 20. The control unit 28 uses the signals from the sensor 46 to control the operation of the engine to match the demand of the drive unit 20 and maintain a suitable supply of liquid to the first reservoir 14.

The internal combustion engine 10 also includes a combustion initiator, which in this embodiment takes the form of a spark plug 48. The spark plug 48 operates under control of the control unit 28 and is connected with a suitable voltage supply system (not shown), which may include a coil, from which a voltage for the spark can be drawn. Spark plug technology will be familiar to those skilled in the art and so will not be described in detail herein.

Figure 2:
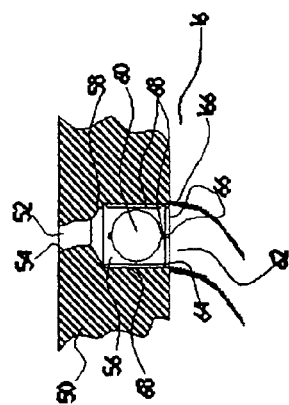
FIG. 2 is a schematic cross-section view of an output valve of the internal combustion engine of FIG. 1.

In this embodiment, the output valving 16 comprises an auto-opening and closing pressure release valve provided in a wall 50 of the engine that defines the lower end of the cylinder 12. As shown in FIG. 2, the output valving 16 includes a bore 52 that opens into the cylinder 12. The bore 52 has a narrower diameter portion 54 that is adjacent to and leads into the cylinder 12 and a wider diameter portion 56 that is spaced from the cylinder and connected to the narrower diameter portion 54 by a wall that defines a conical valve seat 58. The valve seat 58 tapers axially inwardly towards the narrower diameter portion 54 of the bore 52. A valve member in the form of a freely movable ball 60 is provided in the wider diameter portion 56 of the bore 52. The ball 60 is actuated by the pressure balance between the fluids in the cylinder 12 and first reservoir 14. An apertured retaining device 62 for the ball 60 is provided in the wider diameter portion 56 of the bore 52 such that the ball is trapped between the retaining device and the valve seat 58. In the illustrated embodiment, the retaining device 62 comprises an annular frame 64 secured in the wider diameter portion 56 of the bore 52 and a pair of mutually perpendicular cross-members 66 that extend diametrically within and have respective opposed ends connected to the frame 64. Alternatively, the retaining device could be a collar having an inner diameter that is less than the diameter of the ball, or any other device that will prevent the escape of the ball from the wider diameter portion 56 of the bore 52 while allowing relatively free flow of fluid through the bore when the ball moves off of the valve seat 58.

Optionally, the output valving 16 is provided with a flow modifying system in the form of flutes 68 provided in the wider diameter portion 56 of the bore 52. The flutes 68 are arranged to influence the flow of liquid through the wider diameter portion 56 of the bore 52 in such a way that when the ball 60 moves off of the valve seat 58 and liquid is flowing through the bore 52, the ball 60 is not caused to spin (or at least non-translational movement of the ball is reduced). This makes the ball 60 more responsive to pressure changes so that the valve will open and close more quickly in response to changes in the pressure balance between the fluids in the cylinder 12 and first reservoir 14. In the illustrated embodiment there are four equi-spaced flutes 68, which each extend generally parallel to the axis of the wider diameter portion 56 of the bore 52. It will be appreciated that the number, shape and arrangement of the flutes 68 and/or other flow modifying formations provided can be varied to achieve the best result for the flow conditions found to exist in a particular engine. Although not shown, a biasing device such as a spring may be used to bias the ball 60 to its closed position.

Referring again to FIG. 1, the first reservoir 14 is connected to the drive unit 20 by outlet ducting 70. The drive unit 20 comprises respective pump units 72, which receive relatively high pressure liquid from the first reservoir 14 and convert the energy stored in the liquid into a turning force that is applied to the wheels 22.

Figure 3:
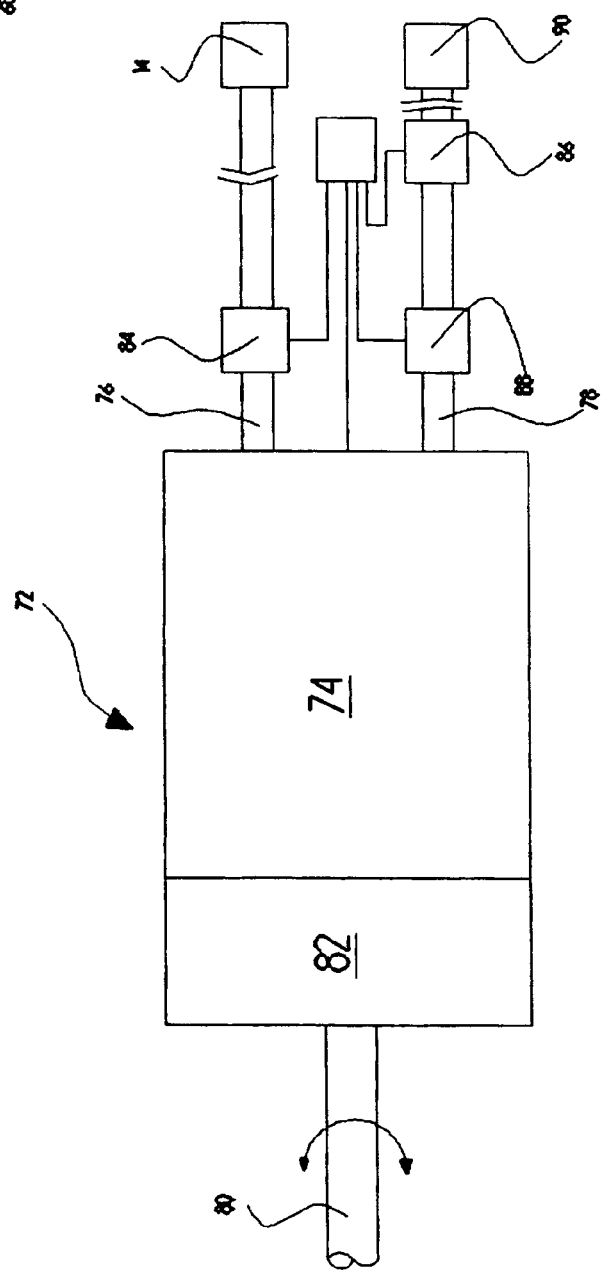
FIG. 3 is a schematic illustration of a pump unit of the motor vehicle drive train of FIG. 1.

Referring to FIG. 3, each pump unit 72 includes a pump 74, an inlet 76 through which relatively high pressure liquid from the first reservoir 14 is received, an outlet 78 through which spent liquid is expelled from the pump unit and an output shaft 80, which transmits the drive force output by the pump unit to the wheel 22 with which it is connected. The pump unit 72 includes gearing 82 and/or other suitable mechanisms operable to allow the direction of rotation of the output shaft 80 to be selectively switched so that a forward and reverse drive can be supplied to the wheel 22. Respective pressure sensors 84, 86, are provided for sensing the pressure of the liquid on the inlet and outlet sides of the pump unit 72. The pressure sensors 84, 86 supply signals indicative of the pressures on the inlet and outlet sides of the pump unit 72 to the control unit 28. The control unit 28 utilises the signals from the sensors 84, 86 to judge whether the wheel 22 is slipping. If the wheel is judged to be slipping, an electrically actuable valve 88 controlled by the control unit 28 can be operated to reduce the flow of liquid through the pump unit 72 until a level of supply is reached at which slipping no longer occurs. The valve 88 can also be signalled to control the flow through the pump unit 72 in such a way as to provide a brake on the wheel 22.

Referring to FIG. 1, the spent relatively low pressure liquid from the pump units 72 is exhausted into a second reservoir 90 via ducting 92. In the drawing, the ducting 92 is shown as a single duct. However, in practice there may be separate ducting for each pump unit 72. A first ducting system 94 extends downstream from the second reservoir 90 to the fluid admission control valve 40 such that when the valve is opened, relatively low pressure liquid from the second reservoir can pass into the cylinder 12. A second ducting system 96 extends from first ducting system 94 to the start up fluid admission control valve 42. Alternatively, the second ducting system 96 could extend directly from the second reservoir. A start up pump 97 is provided in the second ducting system 96 between the second reservoir 90 and the start up fluid admission control valve 42 for raising the pressure of the liquid delivered from the second reservoir to the cylinder 12. The start up pump 97 operates in response to signals received from the control unit 28.

The first reservoir 14 is provided with a pressure relief system that comprises a duct 98 fitted with a pressure relief valve 99 that extends to the second reservoir 90. The pressure relief valve 99 is set to open at a predetermined pressure to allow over pressure to vent from the first reservoir 14 to the second reservoir 90 via the duct 98. The pressure relief valve may be any suitable valve, including an electrically actuated valve operated in response to signals from the sensor 46 or a known spring-biased one-way pressure relief valve. As an alternative to venting to the second reservoir 90, the duct 98 can be omitted to allow the excess pressure to vent to atmosphere.

The exhaust system 36 comprises a heat exchanger 100 that is connected to the exhaust valve 34 by ducting 102 and a condenser 104 that is connected with the heat exchanger 100 by ducting 106. A normally closed solenoid actuated valve 108 is provided in the ducting 106 so that the flow of exhaust gases from the heat exchanger 100 to the condenser 104 can be controlled. The condenser 104 has an exhaust outlet 110 that can be opened to atmosphere by operation of a normally closed solenoid actuated exhaust outlet valve 112. The condenser 104 has a volume that is greater than that of the cylinder 12 and the heat exchanger 100 so it can receive at least substantially all of the content of the cylinder 12 and heat exchanger while the exhaust outlet valve 112 remains closed.

The condenser 104 is connected with a reservoir 114 via ducting 116 so that condensate from the condenser can flow from the condenser into the reservoir. The condensate in the reservoir 114 can be returned to the condenser 104 as a cold water spray via ducting 118. A pump 120 is provided in the ducting 118 for pumping the condensate into the condenser 104 via a refrigeration unit 122. A valve 124 is provided at the outlet end of the ducting 118. The valve 124 includes a nozzle for delivering the cold water in the form of a mist of atomised water droplets. The heat exchanger 100 is provided with a sensor 128, for example a temperature sensor, for supplying the control unit 28 with signals indicative of the pressure in the heat exchanger. The valves 108, 112, 124 and the pump 120 and refrigeration unit 122 operate under control of the control unit 28.

The internal combustion engine 10 comprises ducting 130 leading from the first reservoir 14 to the heat exchanger 100 through which liquid from the reservoir can pass to the heat exchanger to be heated by exhaust gases from the cylinder 12. The liquid passes through a coil 132 in the heat exchanger 100 in which it is heated to provide a supply of steam. Although not shown, the coil 132 may be provided with fins and other heat collecting elements for enhancing heat transfer from the exhaust gases to the liquid. Ducting 134 leads from the heat exchanger 100 to an inlet provided at the inlet end region of the cylinder 12 for conducting steam from the heat exchanger to the cylinder. A steam control valve 136, which in this embodiment is a normally closed solenoid actuated valve, is provided at the downstream end of the ducting 134 to control the flow of the steam into the cylinder 12. The steam control valve 136 operates under control of the control unit 28. A one-way valve 138 is provided in the ducting 134.

The engine cylinder 12 will now be described in greater detail with reference to FIGS. 4 and 5. The cylinder 12 comprises a cylindrical main body portion 150 that includes the main sidewall 152 of the cylinder. The main body portion 150 tapers and has a narrower end that is closed by a domed cylinder head 154 and a wider end that is closed by the wall 50. In this embodiment, the wall comprises a generally circular plate-like body. The main body portion 150 is secured to the wall 50 and cylinder head 154 by means of suitable securing devices, such as bolts 158. Suitable gaskets and/or sealants are provided between the parts to ensure that the cylinder 12 is fluid and pressure tight so as to define a closed chamber.

The main body portion 150 defines a frusto-conical internal space housing a conical body 160. The conical body 160 is fixed to or integral with the wall 50 and extends over substantially the entire length of the main body portion 150. A flowpath for the liquid to be output from the cylinder 12 is defined between the main sidewall 152 and the conical body 160. The flowpath has its upstream end adjacent the inlet end region of the cylinder 12 and its downstream end at the outlet end region of the cylinder. Optionally one or more flow modifying formations can be provided in the flowpath for promoting vortex flow of the liquid. In this embodiment, a flow modifying formation is provided in the form of a spiralling wall 162. The wall 162 can be supported by the sidewall 152 or the conical body 160 and in this embodiment is integral with the conical body. The wall 162 spirals continuously about the conical body 160 from a position close to the tip of the conical body to a position close to the base of the body. The radial extent of the wall 160 is such that the periphery of the wall is close to the main sidewall 152 so that a continuously spiralling passage 164 is defined along the length of the flowpath.

The spiralling passage 164 has its downstream end located close to the upstream end of the outlet valving 16 so that liquid forced along the flowpath tends to be driven into the bore 52. The bore 52 extends through the wall 50 and has a pipe 166 extending from its downstream end. The bore 52 and pipe 166 define a duct that is curved so as to at least substantially form a continuation of the flowpath spiral. The general aim should be to provide a flow path downstream of the spiral that does not subject the flow to any sudden or unnecessary changes of direction that will slow and/or otherwise impede the flow of the outflowing liquid and for this reason, it may be preferred to make the pipe 166 a substantially straight pipe.

Figure 5:
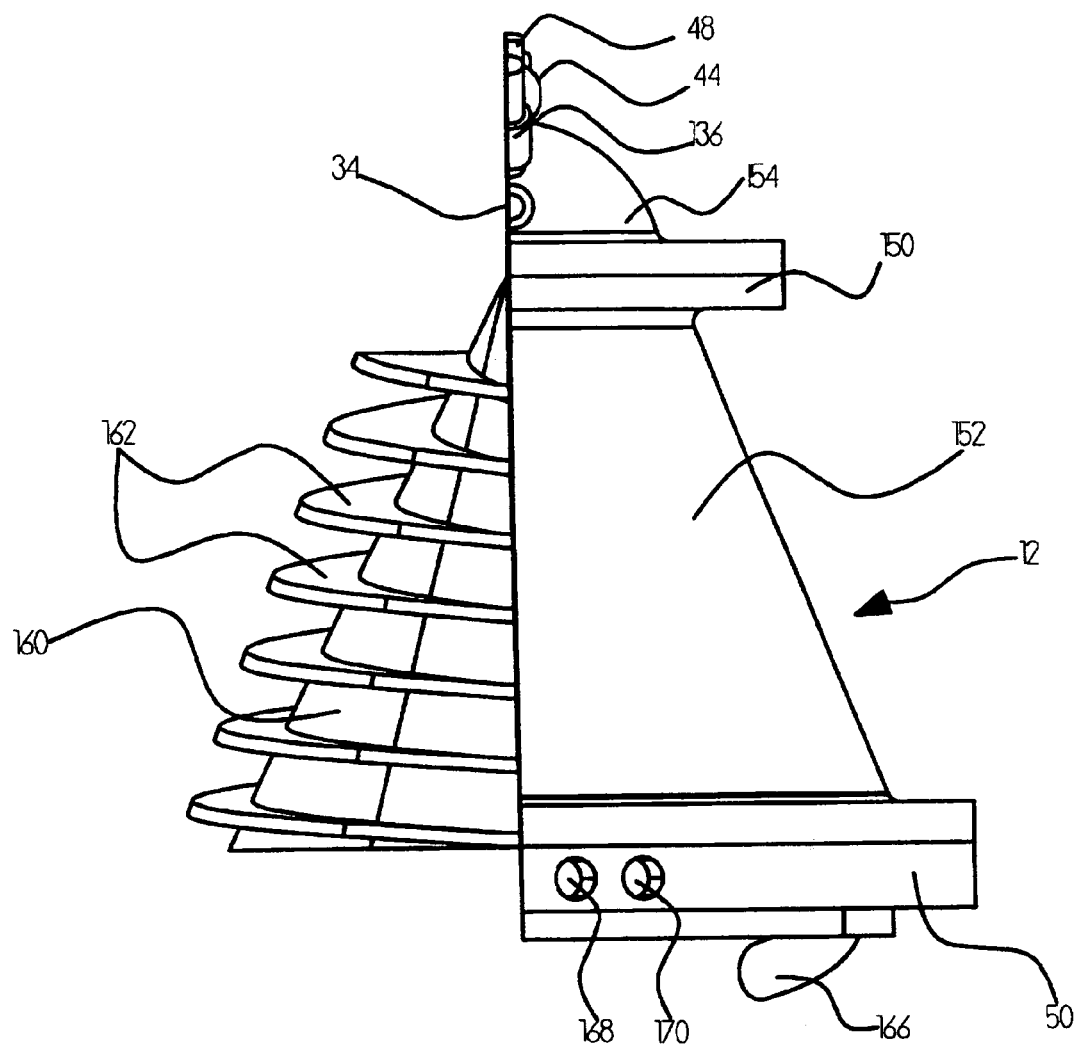
FIG. 5 is a partial cutaway view of the cylinder looking from the right in FIG. 4.

FIG. 5 shows respective inlet ports 168, 170 provided in the wall 50 for receiving the liquid supplied from the second reservoir 90 via the first and second ducting systems 94, 96 and the fluid admission control valves 40, 42. Respective passages (not shown) extend from the inlet ports 168, 170 through the wall 50 to positions at which they open into the space between the main sidewall 152 and conical body 160. Optionally, the passages extending from the inlet ports 168, 170 can be arranged to meet within the wall 50 and output into the cylinder through a common outlet end.

Figure 6:
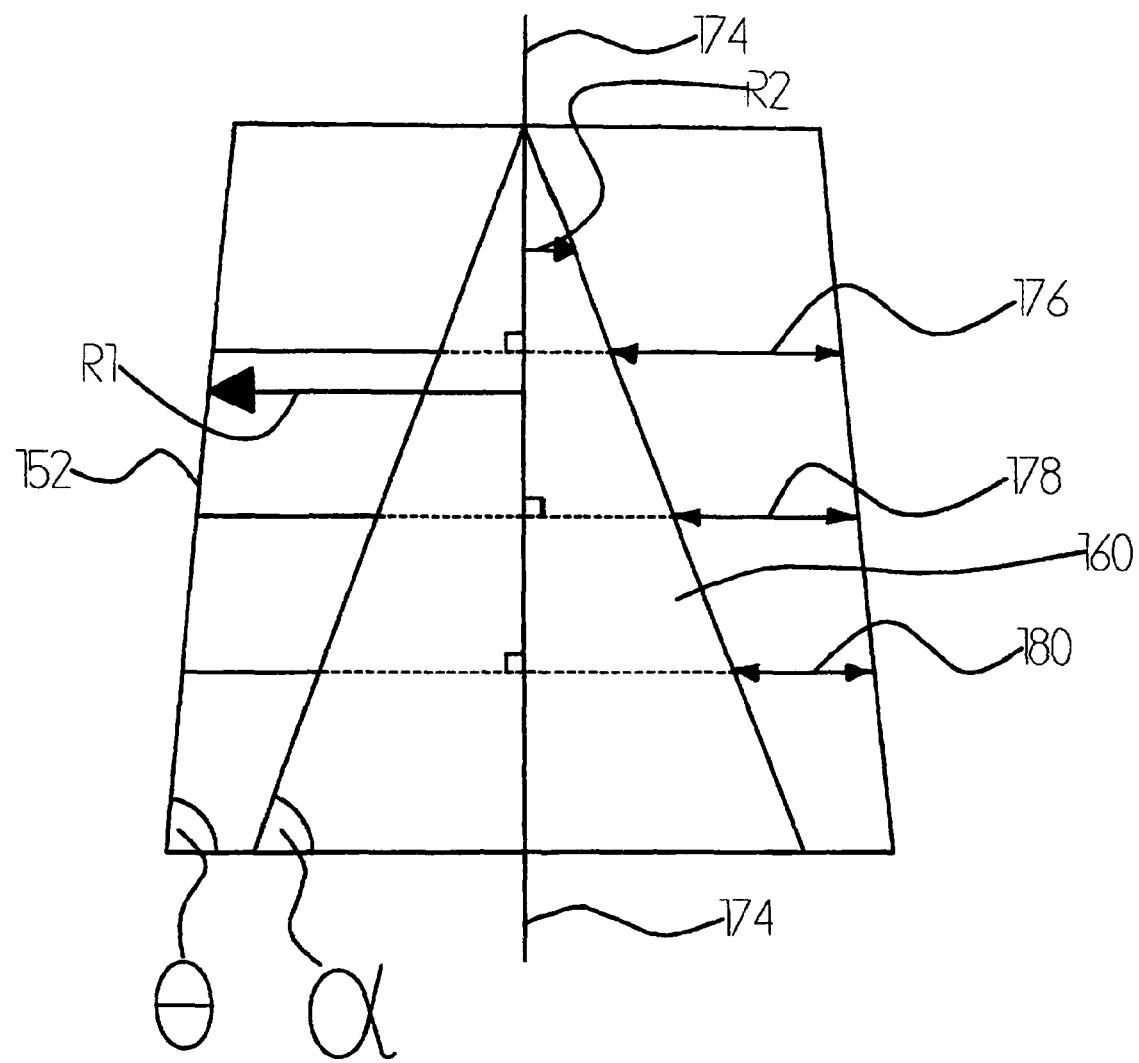
FIG. 6 is a schematic representation of elements of the cylinder of FIGS. 1 to 5.

Referring to FIG. 6, the cylinder 12 has a lengthways extending centreline, or axis, 174. In the direction of flow towards the outlet end region of the cylinder 12, the main sidewall 152 and the conical body 160 both taper outwardly with respect to the centreline 174. The main sidewall 152 has a rate of taper indicated by angle $\theta$ and the conical body 160 has a rate of taper indicated by angle $\alpha$. The angles $\theta$, $\alpha$ are selected to be either equal or such that the rate of taper defined by angle $\alpha$ is greater than the rate of taper defined by the angle $\theta$. Put another way, the radius $R_1$ of the main sidewall 152 increases in the downstream direction of the cylinder 12 at a rate that is equal to or less that the rate of increase of the radius $R_2$ of the conical body 160. This is so that the overall cross-section area of the flowpath defined between the sidewall 152 and conical body 160 does not increase over its length. In this embodiment, the rate of taper of the conical body 160 is greater than the rate of taper of the sidewall 152. The result is that the cross section area of the flowpath measured perpendicular to the centreline 174 (as indicated at positions 176, 178 and 180) decreases in the direction of flow. Thus the flowpath narrows towards its downstream end.

The purpose of having the cylinder main body portion 150 taper outwardly in the direction of flow is to promote vortex flow of the liquid towards to the outlet valving 16. It will be appreciated that if there was no conical body 160 in the cylinder 12, the circular cross section area of the flowpath to the outlet valving 16 would increase considerably. This could result in cavitation in the outflowing liquid with bubbles or pockets of the combustion gases being transported into the first reservoir 14 along with the outflowing liquid. This could produce undesirable pressure losses in the first reservoir 14 as the gases cool and contract. By ensuring that the cross-section area of the flow path does not increase, or actually decreases in the direction of flow, the volume of gas transported from the cylinder 12 into the first reservoir 14 should at least be minimised.

An operating cycle of the internal combustion engine 10 will now be described with reference to FIGS. 7 to 12. In FIGS. 7 to 12, when the valves are open they are represented in the manner of a poppet valve. This representation has been adopted purely for ease of representation and recognition for the reader and should not be taken as in anyway limiting the scope of the claims. Also for ease of representation and recognition for the reader, the spiralling wall 162 has been omitted from FIGS. 7 to 12

In the description of the operation of the internal combustion engine 10 that follows, the liquid to be energised and output through the outlet valving 16 is distilled water and the fuel supplied through the fuel injector 26 is petrol (gasoline). However, it is to be understood that liquids other than distilled water can be used as the working fluid and fuels other than petrol can be used.

FIG. 7 shows the internal combustion engine 10 during an initial stage of a new operating cycle. At the start of the cycle, the output valving 16, air intake valve 24, fuel injector 26, exhaust valve 34 and fluid admission valves 40, 42 are all closed. To initiate a new cycle, the control unit 28 sends a signal to cause the air intake valve 24 to be opened and allow fresh aspirant air 200 to flow into the cylinder 12. The timing of the opening of the air intake valve 24 is determined by the pressure in the cylinder 12. The pressure in the cylinder is determined by reference to temperature indicating signals provided by the temperature sensor 44.

At the time the fresh aspirant air 200 enters the cylinder 12 through the air intake valve 24, the pressure in the cylinder 12 is below atmospheric and so the air is sucked into the cylinder. The relatively cool air entering the cylinder 12 cools the cylinder and its contents. As a result of the low pressure and cooling in the cylinder 12, air 200 continues to be drawn into the cylinder and at least some of the water 202 remaining in the cylinder evaporates to form a vapour 204.

At a set time during this air intake phase, the control unit 28 issues a signal to cause opening of the fuel injector 26 to permit a measured amount of petrol 206 to flow into the cylinder 12 where it mixes with the air 200 to form a combustible mixture of petrol and air. As discussed in more detail below, the amount of petrol admitted is such that the mixture is richer than the stoichiometric ratio to provide excess hydrocarbons in the combustion chamber.

FIG. 8 shows the internal combustion engine 10 after air and fuel intake with the air intake valve 24 and fuel injector 26 closed. Once the air intake valve 24 and fuel injector 26 have closed, the control unit 28 issues a signal to cause the fluid admission control valve 40 to open. Water 208 that has returned from the drive unit 20 to the second reservoir 90 flows into the cylinder 12 through the fluid admission control valve 40. The cylinder 12 then contains a first fluid mass 210 comprising the air 200, vapour 204 and fuel 206 and a second fluid mass 212 comprising the residue water 202 and inflowing water 208. As the second fluid mass 212 fills the cylinder 12, the first fluid mass 210 is compressed so raising its pressure and temperature. When a predetermined fill point is reached, indicated by signals from the temperature sensor 44, the control unit 28 issues a command to close the fluid admission control valve 40.

Figure 9:
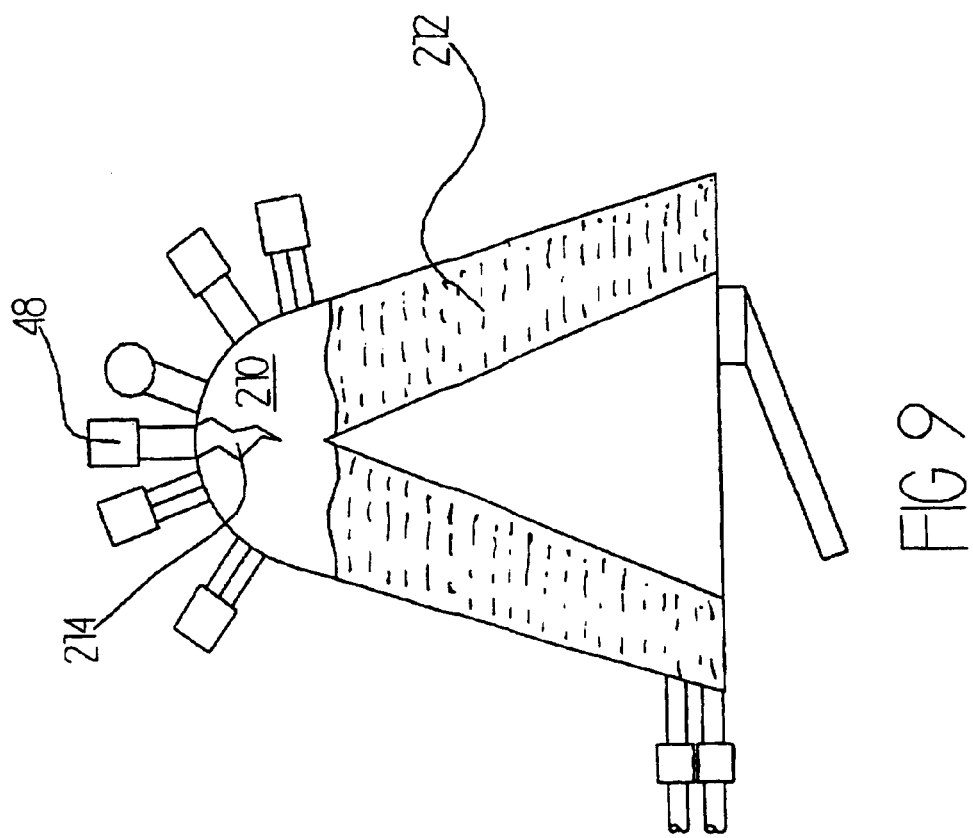
FIG. 9 is a view corresponding to FIG. 7 showing the initiation of a combustion event in the internal combustion engine.

Referring to FIG. 9, once the fluid admission control valve 40 has closed the cylinder 12 is ready for combustion of the air 200/fuel 206 mixture in the first fluid mass 210. Combustion is initiated by the control unit 28 issuing a signal that causes the spark plug 48 to provide a spark 214 in the cylinder 12. The combustion taking place in the first fluid mass 210 causes a rapid increase in pressure and expansion of the first fluid mass. The expanding first fluid mass 210 acts directly on the second fluid mass 212. The pressure in the cylinder 12 is sufficiently high for the second fluid mass 212 to remain in liquid form, although, the rapid temperature increase in the first fluid mass 210 is sufficient to cause the water in the second fluid mass 212 at the interface between the two fluid masses to evaporate so that the interface is predominantly water vapour/steam. This evaporation process provides a useful further pressure increase in the cylinder 12 using heat energy that is normally wasted in a conventional internal combustion engine.

Figure 10:
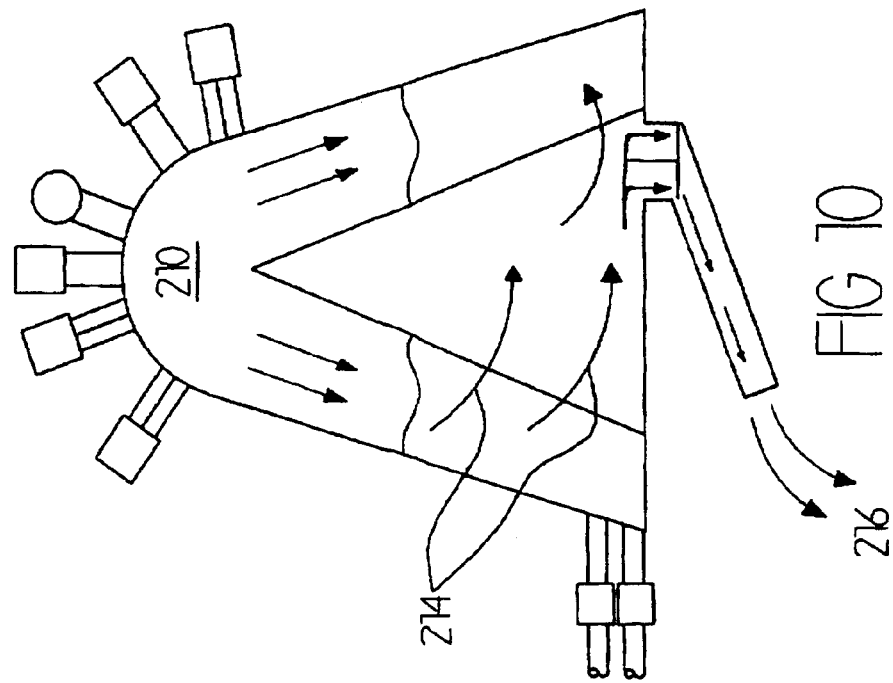
FIG. 10 is a view corresponding to FIG. 7 showing a liquid being forced from the cylinder of the internal combustion engine by a pressure increase generated by the combustion event.

Referring to FIG. 10, the rapid increase in pressure in the cylinder 12 due to the combustion process taking place within the first fluid mass 210 changes the pressure balance between the contents of the cylinder 12 and the content of the first reservoir 14. The higher pressure acting on the cylinder side of the ball 60 causes the ball to lift from the valve seat 58 and allow the water that comprises the second fluid mass 212 to be driven at high pressure and velocity from the cylinder into the first reservoir 14 by an advancing pressure wave generated by the rapidly expanding first fluid mass 210. As indicated by the arrows 214, the water spirals about the centreline of the cylinder as it flows along the spiralling passage 164.

Figure 11:
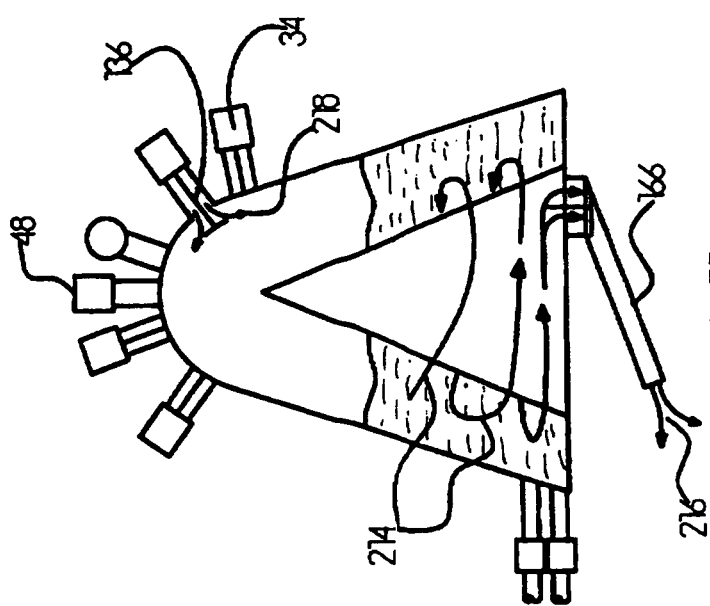
FIG. 11 is a view corresponding to FIG. 7 showing a steam injection process.

Referring to FIG. 11, shortly after the initiation of combustion by operation of the spark plug 48, the control unit 28 issues a signal to cause the opening of the steam control valve 136 to allow a controlled amount of steam 218 at high pressure to flow from the ducting 134 into the cylinder 12. Steam reformation processes take place at temperatures around 700 to 1000° C. Although the injected steam will cool the combustion gases, by controlling the steam input, temperatures in the region of 1000 to 2000° C. or more can be maintained so that as the steam is injected into the fuel (hydrocarbon) rich combustion gases steam reformation takes place causing the separation of hydrogen from the hydrocarbons. Since auto ignition of hydrogen takes place at temperatures of around 585° C., the hydrogen released from the steam spontaneously combusts. This results in heightening of the pressure and temperature in the cylinder so increasing the force driving the water 216 from the cylinder into the first reservoir 14.

Dissociation of hydrogen and oxygen from superheated water/steam occurs at temperatures around 2730° C. and above. In view of the elevated temperature and pressure conditions in the cylinder 12 produced by the combustion of the hydrogen produced by the steam reformation process (the temperature may be in the order of 3500° C. due to the fact that hydrogen burns hotter, faster and more fiercely than conventional hydrocarbon fuels), the continued controlled injection of steam 218 into the cylinder results in the production of additional hydrogen and oxygen by dissociation. The hydrogen and oxygen mix with the combusting gases in the cylinder 12 and combust spontaneously to further increase the pressure in the cylinder 12 to ensure that substantially all of the water in the cylinder is driven at high pressure into the first reservoir 14 to maintain a high pressure in the first reservoir.

Figure 13:
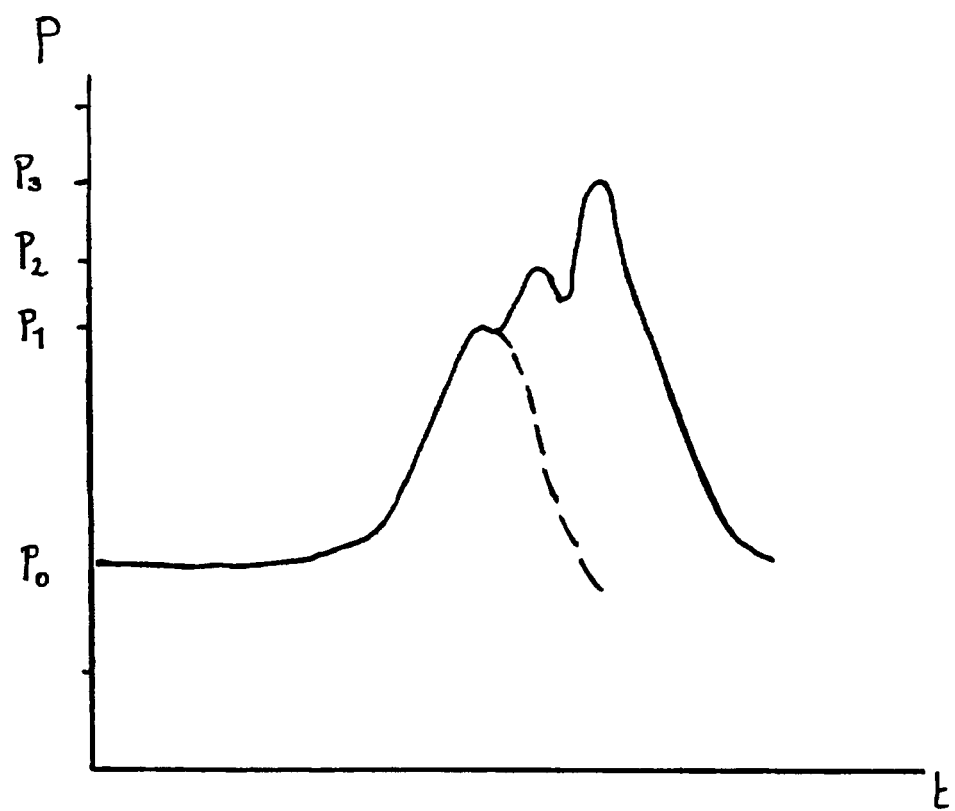
FIG. 13 is a pressure curve illustrating conditions in the cylinder during a combustion event.

Pressure conditions within the cylinder 12 are illustrated in FIG. 13, which shows an exemplary pressure-time curve based on results obtained from a test rig and, in dashed lines, a curve representative of the output of a conventional internal combustion engine. Combustion is initiated at $P_0$, which is the pressure in cylinder 12 at the end of the compression process. Combustion of the fuel rich mixture results in a rapid pressure increase to $P_1$. The subsequent pressure increase to $P_2$ is due to combustion of hydrogen released by steam reformation processes taking place within the cylinder 12. The subsequent pressure increase to $P_3$ is due to combustion of hydrogen and oxygen produced by dissociation of injected steam (and possibly from the water 212). By comparing the areas under the two curves, it can be seen that significant additional power output is obtained from the internal combustions engine 10 as compared with the curve from a conventional internal combustion engine.

Figure 12:
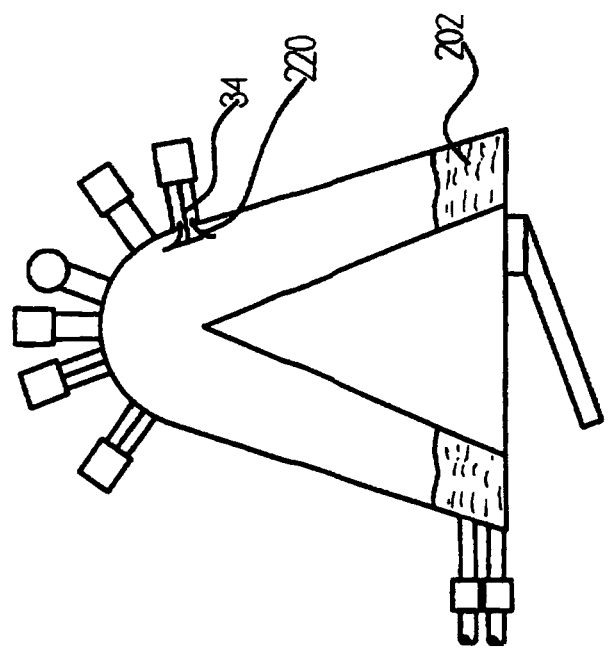
FIG. 12 is a view corresponding to FIG. 7 showing the exhaust of the products of combustion from the internal combustion engine.

Referring again to FIGS. 11 and 12, with the output valving 16 open and the energised water 216 flowing out of the cylinder 12 into the first reservoir 14, the pressure in the cylinder 12 eventually drops to a pressure that no longer exceeds the pressure in the first reservoir (or where a return spring is used, the combined force of the spring and pressure force from the reservoir). The ball 60 then returns to seat on the valve seat 58 leaving a residue of water 202 (FIGS. 7 and 12) in the cylinder. The reduced pressure in the cylinder 12 is reflected by the temperature indicating signals issuing from the temperature sensor 44. When a temperature indicating signal corresponding to a predetermined pressure is received, the control unit 28 issues a signal that causes the exhaust valve 34 to be opened (FIG. 12). The products of combustion 220 then exhaust through the exhaust valve 34, further reducing the pressure in the cylinder 12.

Referring to FIG. 1, the products of combustion (exhaust gases) flowing from the cylinder 12 through the exhaust valve 34 pass through the ducting 102 and into the heat exchanger 100. The exhaust gases are sucked into the heat exchanger 100 due to a partial vacuum that is maintained in the heat exchanger and by virtue of the relatively higher pressure in the cylinder 12. Heat from the exhaust gases is extracted to vapourise the water in the coil 132 to produce the steam that is supplied to the cylinder 12 via the steam control valve 136 during combustion.

Once the pressure/temperature in the heat exchanger 100 reaches a predetermined level, indicated by signals from the sensor 128, the control unit 28 issues a signal to cause opening of the valve 108 between the heat exchanger and condenser 104 so that exhaust gases can flow from the heat exchanger into the condenser. At the time the valve 108 opens, there is a partial vacuum in the condenser 104 so the exhaust gases are drawn into the condenser from the cylinder 12 and heat exchanger 100. At a predetermined time following the opening of the valve 108, the exhaust outlet valve 112 opens to allow the condenser to vent to atmosphere. At this stage, the pressure in the cylinder 12, heat exchanger 100 and condenser 104 will rapidly fall to a pressure substantially equal to atmospheric pressure. In response to pressure representative signals from the sensor 128, or at a predetermined time after opening, the control unit 28 causes the valve 112 to be closed. The control unit 28 then issues signals that cause the pump 120 to operate and pump water from the reservoir 114 through the refrigeration unit 122 and the valve 124 to open. The cooled water is discharged from the valve 124 into the condenser 104 as a fine spray and causes a rapid cooling of the exhaust gases. The rapid cooling of the exhaust gases produces a pressure drop that maintains the flow of exhaust gases from the cylinder 12 to the condenser 104 to produce a partial vacuum in the cylinder 12 and heat exchanger 100. The cooling of the exhaust gases also causes water vapour entrained in the exhaust gases to condense. The condensate flows back to the reservoir 114 via the ducting 116.

When a required pressure is reached, as indicated by signals from the sensor 128, the control unit 28 issues a signal to cause closure of the exhaust valve 34 and the valve 108. With the exhaust valve 34 and valve 108 closed, the heat exchanger 100 is isolated from the cylinder 12 and condenser 104. The partial vacuum that exists within the heat exchanger 100 when the valves 34, 108 close serves to insulate the heating coil 132 and is available to draw exhaust gases from the cylinder 12 during the initial stages of the next exhaust process.

The operating cycle of the internal combustion engine 10 described above is one that takes place when the engine is running. Typically at engine start up, there will not be sufficient pressure available in the engine to pump liquid from the second reservoir 90 to achieve the desired compression ratio in the cylinder 12. Accordingly, at start up, the control unit 28 signals the start up fluid admission control valve 42 to open and the start up pump 97 to pump fluid from the second reservoir 90 into the cylinder 12. Once the engine is running normally, the control unit 28 takes the start up fluid admission control valve 42 and pump 97 out of the operating cycle and liquid is supplied to the cylinder 12 from the second reservoir 90 via the fluid admission control valve 40 in the way previously described.

It is envisaged that the engine will be configured and/or controlled in such a way that when the output valving 16 closes, there will always be a residue of liquid left in the cylinder 12. The purpose of this is to prevent products of combustion from flowing into the first reservoir 14. If some of the products of combustion were to pass into the first reservoir 14, they would contract as they cooled thus undesirably reducing the pressure in the reservoir.

Figure 14:
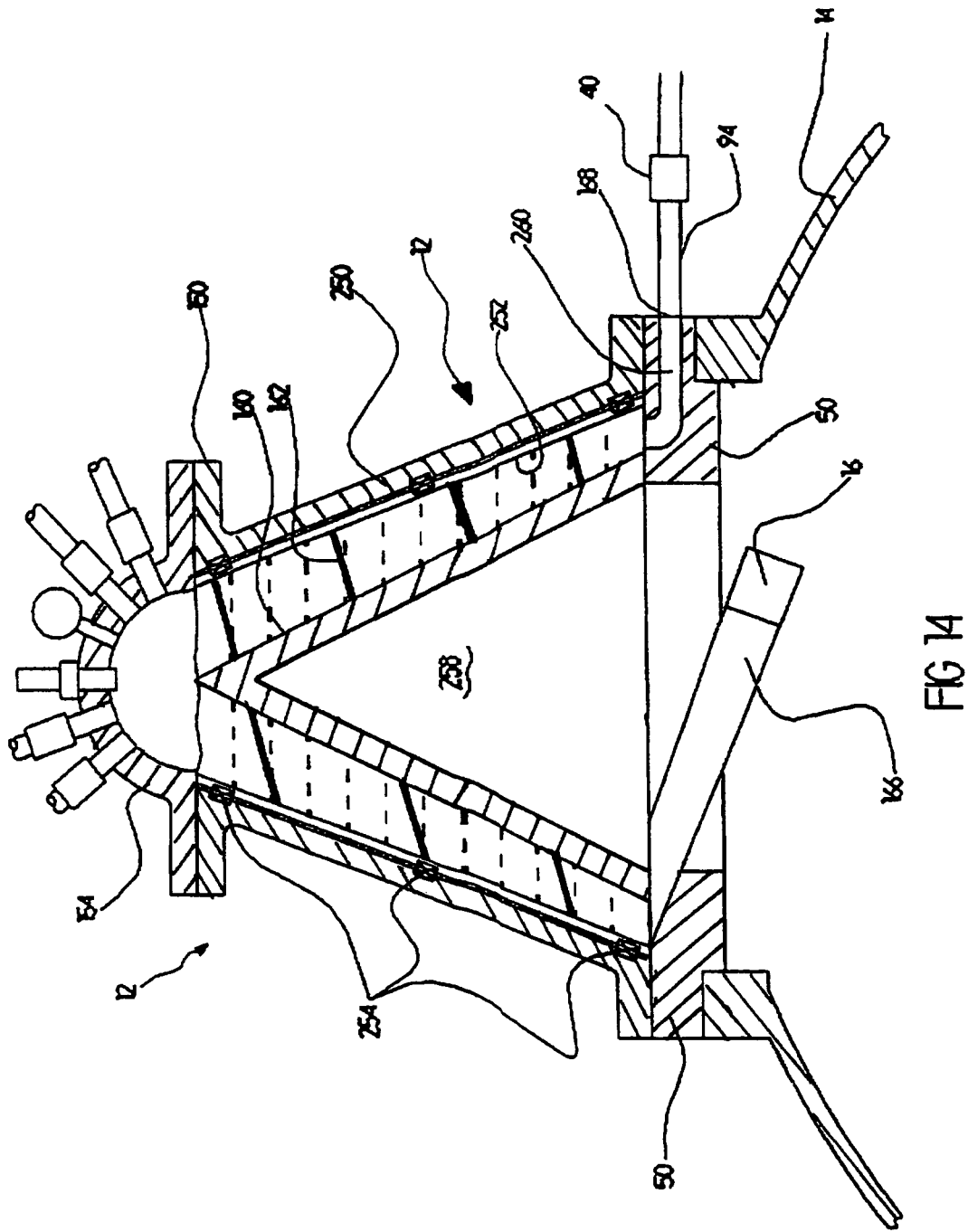
FIG. 14 is a view similar to FIG. 4 showing some modifications that can be made to the internal combustion engine.

FIG. 14 shows various modifications to the cylinder 12. These modifications can be implemented individually or in combination. A first modification is that the sidewall of the main body portion 150 is a two-part wall comprising a static outer wall 250 and a rotatable inner wall 252. The outer wall 250 is secured to the wall 50 and cylinder head 154 in similar fashion to the sidewall 152. The rotatable inner wall 252 is supported on taper roller bearings 254 disposed between the inner wall and outer wall such that the inner wall can rotate relative to the outer wall 250. This allows the inner wall 252 to rotate with the liquid vortex, so reducing resistance to the vortex and reducing the resistance to the flow of the liquid towards the outlet valving 16. The inner wall 252 should have a low mass and where one or more flow modifying formations are provided, such as the spiralling wall 164, they should be supported on by the conical body 160, or at least not by the inner wall 252.

A further modification shown in FIG. 14 is that the conical body 160 is hollow and the end wall 50 is generally annular. The conical body 160 thus functions as a part of a wall separating the cylinder 12 and first reservoir 14 and the interior 258 of the conical body forms a part of the first reservoir 14. This construction provides the potential for reducing the overall size of the internal combustion engine, without reducing capacity.

Also shown in FIG. 14 is an internal passage 260 for conducting liquid from the inlet port 168 (see FIG. 5) to the space defined between the sidewall 252 and the conical body 160.

Also, the outlet valving 16 is located in the pipe 166 rather than in the end wall 50.

Control of the injection of steam 218 into the cylinder 12 is important. If the steam injection is not properly controlled and too much steam is injected into the cylinder 12, one or more of the following problems can be expected to be encountered: the fuel air mixture may become too damp to ignite, the combustion gases may be quenched, significant power losses may occur due to cooling of the combustion gases and loss of pressure in the chamber and/or the temperature and pressure in the chamber will be reduced to a level that does not support steam reformation and/or dissociation. In the embodiment shown in FIG. 1, the control unit 28 controls the steam injection using temperature signals from the temperature sensor 44 and closes the valve if the temperature within the cylinder falls below a predetermined level. An alternative means for controlling steam injection into the cylinder will now be described with reference to FIG. 15.

In the following description of the modified internal combustion engine 10 shown in FIG. 15, parts and systems that are similar to or the same as parts and systems illustrated in FIGS. 1 to 12 will be referenced by the same reference numeral and may not be described again.

It will be appreciated that for the purposes of controlling operation of the internal combustion engine, at least during some phases of its operation, a temperature sensor used to sense the temperature in the cylinder 12 needs to be highly responsive to temperature changes taking place within the cylinder. In FIG. 15 the temperature sensor is an infrared temperature sensor 44 that senses the temperature in the cylinder through a translucent window (not shown). Alternatively, for example, a high temperature embedded photodiode such as is disclosed in U.S. Pat. No. 5,659,133 (the content of which is incorporated herein by reference) could be used.

Figure 15:
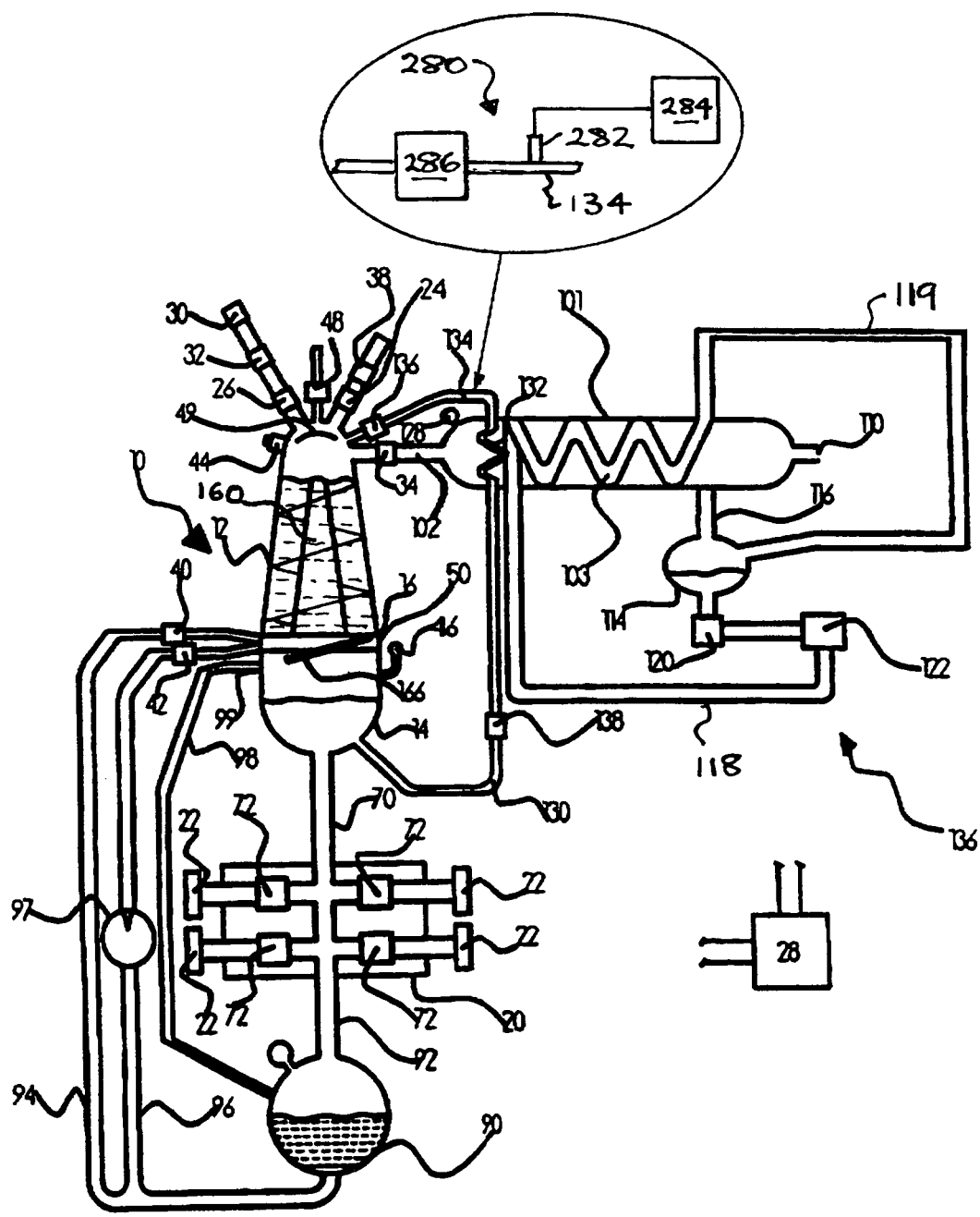
FIG. 15 is a view similar to FIG. 1 showing more modifications that can be made to the internal combustion engine.

In addition to the change in the temperature sensing system, the modified internal combustion engine 10 shown in FIG. 15 includes a protector 49 for the spark plug 48 and a modified exhaust system 136. Instead of two condensers as in FIG. 1, the modified exhaust system 136 has heat exchange device 101 that functions both to extract heat from the exhaust to provide steam for injection into the cylinder during combustion processes and as a condenser for cooling the exhaust gases and condensing the water vapour entrained in the exhaust gases.

The protector 49 is a shield made of any suitable material (ie a material able to withstand the temperatures and pressures that will exist within the cylinder 12 when the engine is in use) and is positioned to protect the spark plug 48 against splashing that might cause it to become damp and/or corroded in a way that might lead to misfires. The protector 49 should be shaped and/or positioned such that it does not impede the flow and mixing of the air and fuel entering the cylinder 12 and to minimise the impedance to the spread of the ignition flame through the fuel-air mixture. The best shape and position for a particular cylinder configuration can be determined empirically.

The heat exchange device 101 is connected to the cylinder 12 by ducting 102 and flow communication between the cylinder and heat exchange device is controlled by an exhaust valve 34 in the same way as in the internal combustion engine shown in FIGS. 1 to 12. The heating coil 132 in which steam is produced by extracting heat from the exhaust gases passes through the upstream end of the heat exchange device and is connected to the cylinder by ducting 134 fitted with a steam control valve 136. At the downstream end of the heat exchange device 101, there is an exhaust outlet 110 that is permanently open to atmosphere. The heat exchange device 101 is connected to a reservoir 114 by ducting 116 so that condensate from the reservoir can flow from the heat exchange device into the reservoir. Ducting 118 extends from the reservoir 114 to the inlet end of a condensing coil 103 that is a part of the heat exchange device 101 and is located downstream of the heating coil 132. Return ducting 119 extends from the outlet end of the condensing coil 103 to the reservoir 114. The return ducting 119 and ducting 118 together with the condensing coil 103 form a cooling water circuit for extracting heat from the exhaust gases as they pass through the heat exchange device 101. A pump 120 and radiator and/or refrigeration unit 122 are fitted in the ducting 118 for cooling the water drawn from the reservoir 114 before it reaches the condensing coil 103.

In use, when the exhaust valve 34 opens, exhaust gases will flow through the ducting 102 into the upstream end of the heat exchange device 101. Here it will pass over the heating coil 132. As the exhaust gases pass over the heating coil 132 heat is extracted from the gases to convert the water flowing through the heating coil into steam. Downstream of the heating coil 132, the exhaust gases lose further heat to the cooled water flowing through the condensing coil 103. The condensing coil 103 is made sufficiently long to allow enough contact to cool the exhaust gases sufficiently to cause the entrained water vapour to condense out and form a condensate pool in the bottom of the heat exchange device 101 that flows back to the reservoir 114 via the ducting 116. Although not shown, baffles may be provided in the heat exchange device 101 to lengthen the flow path over the condensing coil 103 and/or heating coil 132 to ensure the desired amount of heat is removed from the exhaust gases.

In this embodiment, the exhaust outlet 110 is permanently open to atmosphere. In order to purge the cylinder 12 of exhaust gases, closing of the exhaust valve 34 and opening of the air intake valve 24 overlaps so that the inflowing air can scavenge the cylinder. The timing of the overlap of the opening of the air intake valve 24 and closing of the exhaust valve 34 can be determined empirically with a view to obtaining a desired level of performance from the internal combustion engine.

FIG. 15 also illustrates a system 280 for providing a combustible hydrogen containing compound in the steam that is injected into the cylinder 12 via the steam control valve 136. This combustible hydrogen containing compound is provided for promoting steam reformation in the cylinder 12. In the embodiment described with reference to FIGS. 1 to 12, the combustible mixture provided in the cylinder 12 is made fuel rich to provide an excess of hydrocarbons for promoting steam reformation in the cylinder 12 when steam is injected into the cylinder via the steam control valve 136. For some embodiments, it may not be desirable to have a rich fuel-air mixture for the initial combustion or it may be desirable to add to the fuel for steam reformation subsequent to the commencement of combustion. The system 280 can be used to provide some or all of the fuel for the steam reformation process.

The system 280 comprises a valve 282 for injecting fuel into the ducting 134 upstream of the steam control valve 136. The valve 282 is connected with a reservoir 284 containing a combustible hydrogen containing compound that is to be injected into the ducting 134. The reservoir 284 may be the fuel reservoir 30 or a separate reservoir. When a separate reservoir is provided, it may contain the same combustible hydrogen containing compound as the fuel reservoir 30 or a different compound. Thus, for example, the fuel reservoir 30 can be used to supply a hydrocarbon fuel, for example, for forming the combustible mixture in the cylinder, while the reservoir 284 is used to supply a different hydrocarbon or alcohol, for example methanol, that is suited to steam reformation. Operation of the valve 284 can be controlled by the control unit 28 based on signals from the sensor 44 or by a separate control using signals from a different sensor.

For some embodiments, it may be desirable to inject the hydrogen containing compound into the steam intermittently so that when the steam control valve 136 is opened the steam injected will comprise a first portion comprising steam mixed with the hydrogen containing compound and a second portion with no added hydrogen containing compound.

Optionally, the system 280 may include a catalyst unit 286 disposed downstream of the valve 284. The catalyst unit 286 comprises a catalytic material that will promote the release of hydrogen from the combustible hydrogen containing compound that is mixed in with the steam. For example, if the hydrogen containing compound is methanol, copper chromite pipes could be used as the catalyst at a temperature of 360° C. In cases in which a catalyst is used, the fluid injected by via the steam control valve 136 will be an aqueous fluid comprising steam, hydrogen containing compound and hydrogen. This mixture when injected into the cylinder will promote steam reformation that produces more hydrogen that will combust in the cylinder 12.

It will be appreciated that the modified internal combustion engine 10 could be provided with a pressure sensor, including a temperature sensor such as a thermocouple, in addition to the infrared sensing temperature device (or other optical temperature sensing device). It will also be appreciated that the internal combustion engine shown in FIGS. 1 to 12 could be fitted with an infrared temperature sensor (or other optical sensor) instead of or in addition to the pressure sensor already shown and may be provided with a system 280 for adding a combustible hydrogen containing compound to the steam upstream of the steam control valve 136.

Figure 16:
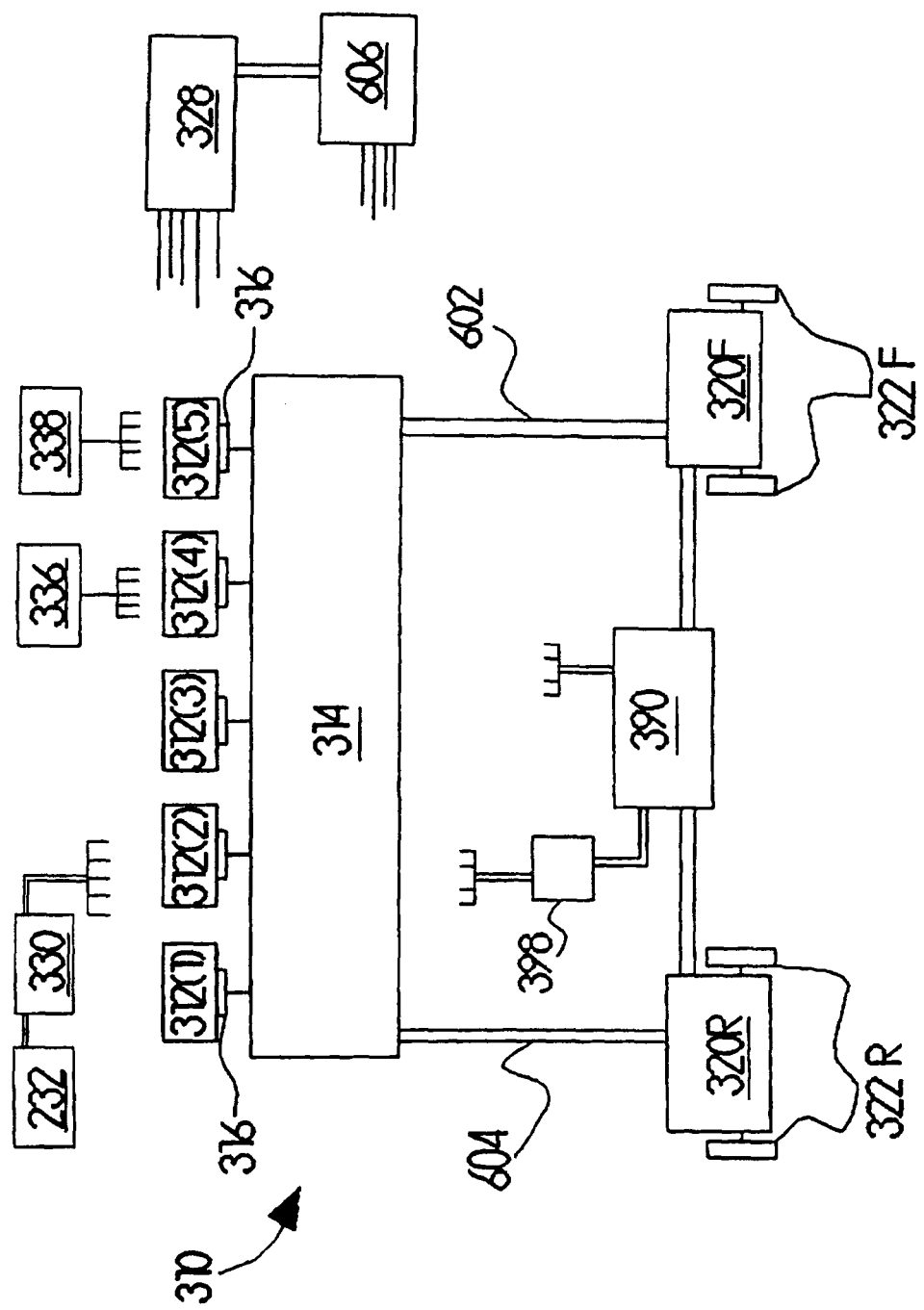
FIG. 16 is a schematic illustration of a multi-cylinder internal combustion engine connected to a motor vehicle drive train.

FIG. 16 shows a multi-cylinder internal combustion engine 310. To avoid repetition of description, those parts of the multi-cylinder combustion engine 310 that are the same as, or similar to, those of the internal combustion engine 10 are labelled with the same reference numeral incremented by 300 and will not be described in detail again.

The multi-cylinder internal combustion engine 310 comprises five cylinders 312(1)-312(5) that are equipped and operate in the same way as the cylinder 12 of the engine 10. In this embodiment, the cylinders 312(1)-312(5) are each connected to a common air intake system 338 and exhaust system 336 and each is provided with a fuel injector (not shown) fed from a common fuel reservoir 330 via a common fuel pump 332. There is a second reservoir 390 and start up pump 398 that feeds fluid from the second reservoir to fluid admission control, valves (not shown) corresponding to the valves 40, 42 shown in FIG. 1. While using common parts as described may be convenient for many engine configurations, it will be appreciated that in a multi-cylinder internal combustion engine, multiple air intake systems, exhaust systems, liquid return systems and/or fuel pumps and reservoirs can be used.

The first reservoir 314 is connected to the output valving 316 of each cylinder 312. In the illustrated embodiment, the first reservoir 314 is an annular tubular structure. It is envisaged that using this 'doughnut' configuration will reduce pressure losses due to flow resistance. Although not show connected in this way, the cylinders 312(1) to 312(5) can be directly connected to the first reservoir 314 so that the outflowing liquid can flow directly into the reservoir as illustrated in FIGS. 1, 4 and 13.

The first reservoir 314 is connected to respective ducting systems 602, 604 that lead to a front wheel drive unit 320F and a rear wheel drive unit 320R. The drive units 320F, 320R convert the energy stored in the liquid received from the first reservoir 314 into a drive force to turn respective pairs of wheels 322F, 322R. Each of the drive units 320F, 320R returns the spent liquid to the second reservoir 390 and operates in essentially the same way as the drive unit 20 of FIG. 1.

In this embodiment, the control unit 328 controls the operation of the individual cylinders 312(1)-312(5) under the control of master engine control unit 606. The master engine control unit 606 receives input commands from a driver operated pedal and/or button(s) (not shown) and also controls the operation of the drive units 320F, 320R. Although not shown, it will be appreciated that a separate control unit can be provided to control the braking function of the drive units 320F, 320R. Such a control unit would be connected to the master control unit 606, which has overall responsibility for the control of the internal combustion engine 310.

In use, the individual cylinders 312(1)-312(5) of the multi-cylinder internal combustion engine 310 operate in the same way as the engine 10. The activity level of the individual cylinders 312(1)-312(5) is controlled based on the pressure in the first reservoir 314. If the pressure in the first reservoir 314 is above a predetermined level and the demand on the engine is low, the number of cylinders 312(1)-312(5) operating can be reduced proportionately.

Another internal combustion engine 710 connected to a drive unit will now be described with reference to FIG. 17. Although not limited to such use, in the description that follows the drive unit 720 will be described as being used to drive a motor vehicle. The internal combustion engine 710 and drive unit 720 have many features and components that correspond to or are similar to those of the internal combustion engine 10 and drive unit 20 illustrated by FIGS. 1 to 12. To avoid repetition, in the description that follows, components that are the same as or similar to those shown in FIGS. 1 to 12 are labelled with the same reference numeral incremented by 700 and may not be described in detail again. For ease of description, the internal combustion engine 710 will be described as a single cylinder engine. However, it is to be understood that the internal combustion engine 710 may be a multi-cylinder engine as, for example, described with reference to FIG. 16.

In this embodiment, the internal combustion engine 710 is a compression ignition engine and the working fluid that is energised by the combustion process is distilled water, or a mixture of water and corrosion inhibitors.

The internal combustion engine 710 comprises a single combustion chamber in the form of a closed cylinder 712 defined by an engine block (not shown). The cylinder 712 tapers in its lengthways direction and is connected at its lower, wider, end with a first reservoir 714. Output valving 716 is provided in the connection between the cylinder 712 and the first reservoir 714. In this embodiment, the output valving 716 is a pressure actuated one-way valve similar to the valve 16 illustrated in FIG. 2, although, any other suitable form of valve, including an electrically actuated valve, can be used. The first reservoir 714 is used to store relatively higher pressure water that is output from the cylinder 712. The first reservoir 714 is provided with a pressure relief valve 718 that protects against overpressure in the reservoir. Although not shown, instead of a pressure relief valve 718, the internal combustion engine 710 can be provided with a pressure relief system similar to that shown in FIG. 1.

The water stored in the first reservoir 714 is supplied at relatively higher pressure to a drive unit 720, which in this embodiment is the primary of two drive units, the second of which will be described in greater detail below. The primary drive unit 720 may comprise respective pumps (not shown) for driving the wheels of a vehicle (also not shown) as described in connection with FIGS. 1 and 3, or separate front and rear drive units as described in connection with FIG. 16. In the illustrated embodiment, the primary drive unit 720 is a pump that converts the energy stored in the relatively higher pressure water received from the first reservoir 714 into a drive force used to turn the wheels of the vehicle. An electrically actuated control valve 721 is provided between the first reservoir 714 and the primary drive unit 720 and is operable to control the flow of water from the reservoir to the drive unit.

The cylinder 712 is provided with inlet valving in the form of an air intake valve 724 and a fuel injector 726 and exhaust valving in the form of an exhaust valve 734. The exhaust valve 734 outputs to an exhaust system 736. The air intake valve 724 is connected to an air intake system (not shown) such as the air intake system 38 described in connection with FIG. 1 and the fuel injector 726 is connected to a fuel reservoir via a fuel pump in, for example, similar fashion to the fuel injector 26 shown in FIG. 1.

The operation of the control valve 721, air intake valve 724, fuel injector 726 and exhaust valve 734 is controlled by a control system that includes a microprocessor based control unit 728. The control unit 728 may be a higher level engine management control unit, which also controls all aspects of the operation of the engine, or a unit dedicated to managing particular engine functions and operatively connected to a higher level engine management controller. In order to make the drawings more intelligible, the connections between the control unit 728 and the parts it controls and/or receives signals from are not shown.

In the same way as the cylinder 12 in FIG. 1, the cylinder 712 is provided with two electrically actuated fluid admission control valves 740, 742 for controlling the admission into the cylinder of working fluid (water) supplied from a second reservoir 790. The start up fluid admission control valve 740 controls the admission of the relatively lower pressure water from the second reservoir 790 during engine start up. The water admitted into the cylinder 712 through the start up fluid admission control valve 740 is pressurised by a start up pump 797. The admission control valve 742 controls the admission of the relatively lower pressure, water from the second reservoir 790 during normal operation of the internal combustion engine 710.

The cylinder 712 is additionally provided with two electrically actuated hot water admission control valves 1000, 1002 for controlling admission to the cylinder of hot water from a third reservoir 1004. The first hot water admission control valve 1000 controls the admission of hot water to the lower, wider, end of the cylinder 712 during a process to compress aspirant air in the cylinder. The second hot water admission control valve 1002 controls the admission of hot water to the upper, narrower end of the cylinder 712. Each of the four electrically actuated admission control valves 740, 742, 1000, 1002 is controlled by signals from the control unit 728.

Figure 4:
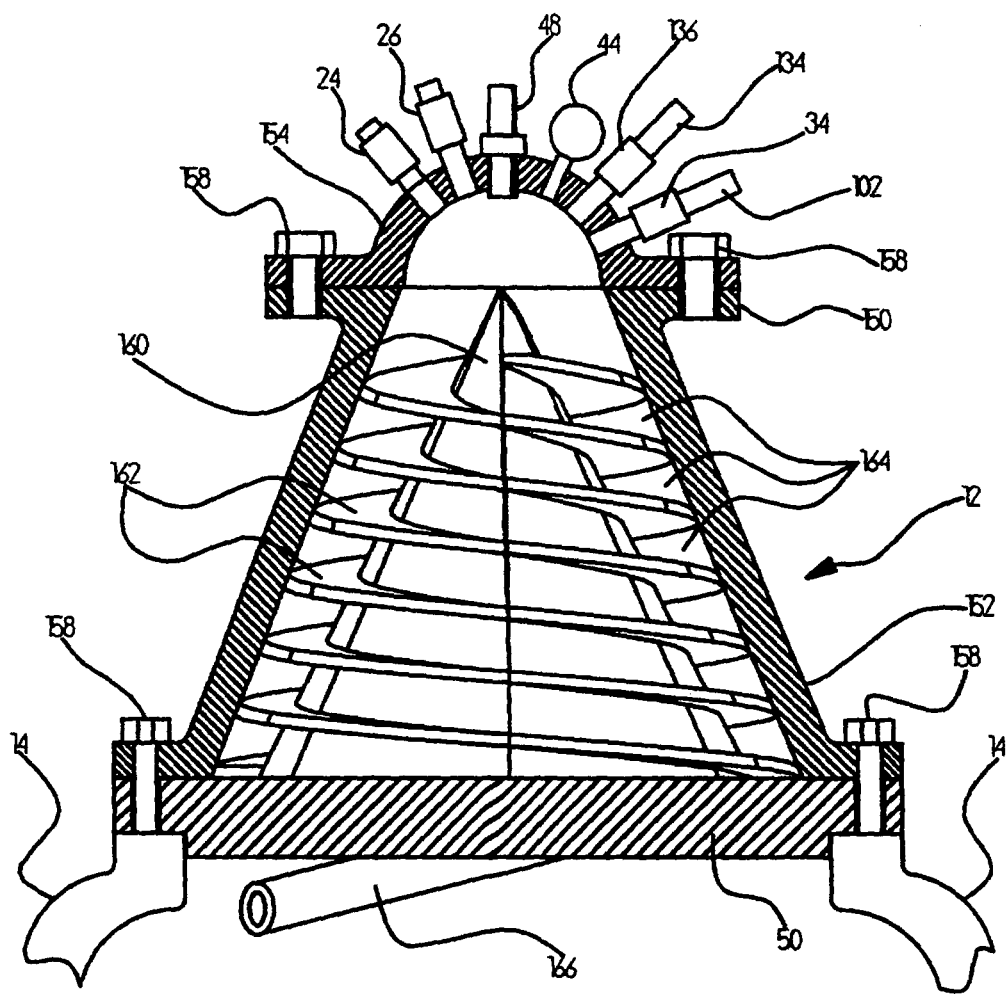
FIG. 4 is a schematic section view of a cylinder of the internal combustion engine of FIG. 1.

The cylinder 712 is provided with a conical body 860 and a spiralling wall that defines a spiralling passage 864 in similar fashion to that in the cylinder 12 shown in FIGS. 4 and 5.

The third reservoir 1004 is connected to the cylinder 712 for receiving pressurised water from the cylinder secondarily to the first reservoir 714. Admission of water into the third reservoir 1004 is controlled by an electrically actuated valve 1006, which is controlled by signals from the control unit 728. The third reservoir 1004 has a first outlet connected with outlet ducting 1008 through which hot water from the third reservoir is conducted to the cylinder 712 via the first hot water admission control valve 1000. The third reservoir 1004 has a second outlet connected with outlet ducting 1010, which leads to the second hot water admission control valve 1002. A pump 1012 is provided in the outlet ducting 1010 for raising the pressure of the hot water output from the third reservoir 1004. An optional electrically actuated outlet valve 1014 is provided in the outlet ducting 1010 between the third reservoir 1004 and the pump 1012. The function of the outlet valve 1014 can be provided by the pump 1012.

The third reservoir 1004 has a third outlet that is connected to a secondary drive unit 1016 via an electrically actuated control valve 1018. The electrically actuated control valve 1018 is actuated by signals from the control unit 728 to control the release of relatively high pressure water from the third reservoir 1004 to the secondary drive unit 1016. In the illustrated embodiment, the secondary drive unit 1016 is a pump unit that converts energy stored in the water into a force that can be used to drive the wheels of the motor vehicle. It will be appreciated that as an alternative to having separate drive units 720, 1016 as shown, the third reservoir 1004 could feed to the drive unit 720, in which case, the engine would be equipped to switch between supplies from the first reservoir 714 and third reservoir 1004. Yet another alternative would be to have the two reservoirs 714, 1004 output to a pump having respective vane sets sized to match the average output pressures of the two reservoirs to allow their outputs to be used in tandem to drive a single output shaft.

The exhaust system 736 comprises a first condenser 800 that is connected to the exhaust valve 734 by ducting 802 and a second condenser 804 that is connected with the first condenser 800 by ducting 806. A normally closed solenoid actuated valve 808 is provided in the ducting 806 so that the flow of exhaust gases from the first condenser 800 to the second condenser 804 can be controlled. The second condenser 804 has an exhaust outlet 810 that is open to atmosphere. The first and second condensers, 800, 804 are each connected with ducting 816. Condensate from the condensers flows through the ducting 816 into a reservoir 814. Flow of the condensate from the condenser 800 is controlled by a normally closed solenoid actuated valve 817 that is controlled by the control unit 728. Ducting 818 leads from the water reservoir 814 to respective normally closed solenoid actuated valves 824. A water pump 820 is provided in the ducting 818 for pressurising water drawn from the water reservoir 814. A radiator 821 and, optionally, a refrigeration unit 822 are provided in the flow path between the water pump 820 and the valves 824. The valves 824 and water pump 820 are controlled by the control unit 728 and are operable to provide a fine cooled water spray into the first and second condensers 800, 804.

In addition to the control unit 728, the control system for the internal combustion engine 710 includes respective pressure sensors 744, 746, 791, 828, 1020 for sensing the pressure in the cylinder 712, first reservoir 714, second reservoir 790, first condenser 800 of the exhaust system 736 and third reservoir 1004. Each pressure sensor provides pressure indicating signals for use by the control unit 728. In each case, the pressure sensor 744, 746, 791, 828, 1020 may be any form of sensor suitable for providing a pressure indicating signal, including temperature sensors such as thermocouples.

Operation of the internal combustion engine 710 will now be described with reference to FIGS. 17 to 23.

Figure 17:
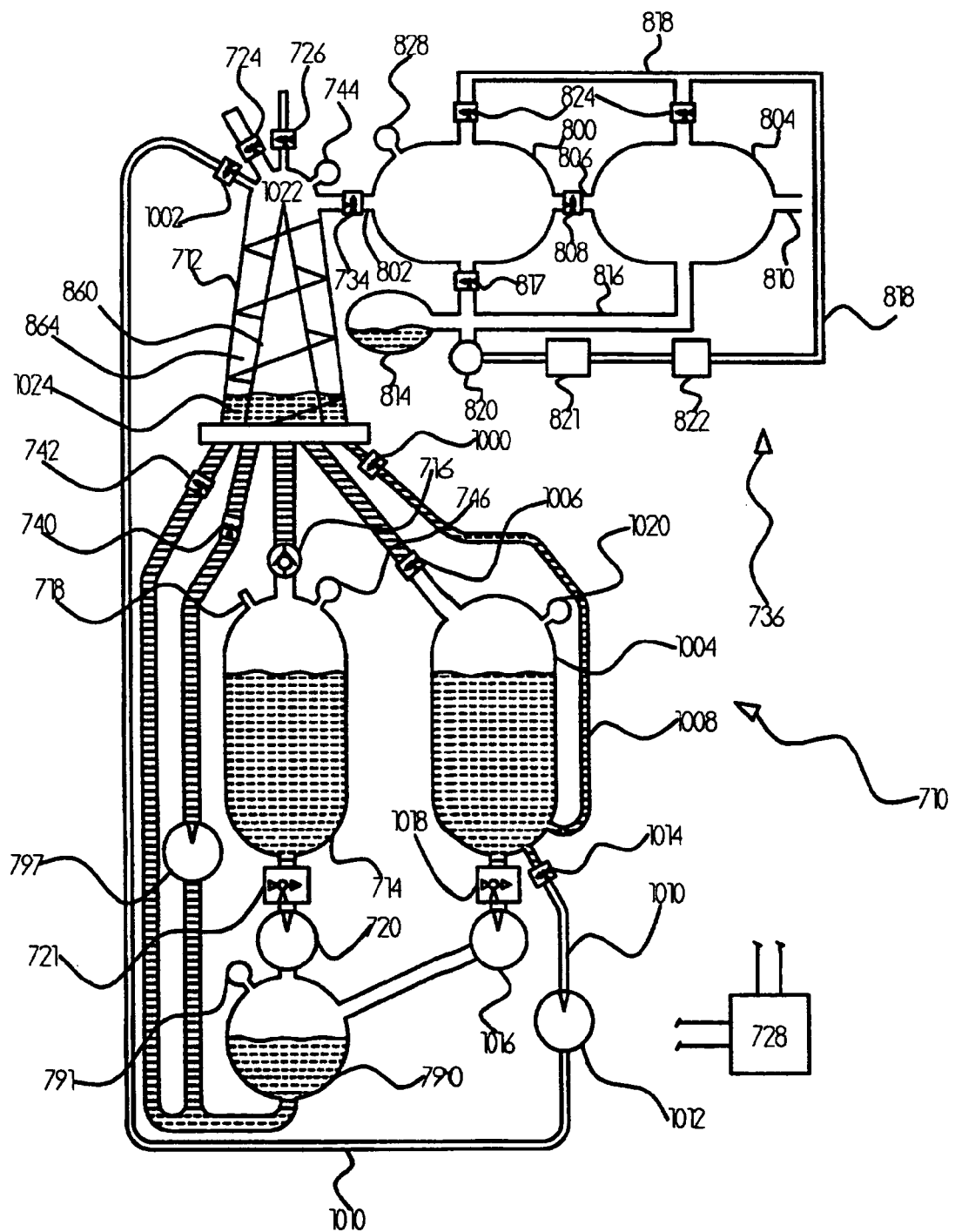
FIG. 17 is a schematic illustration of another internal combustion engine connected to two drive units showing the engine at start up.

In FIG. 17, the internal combustion engine 710 is shown at engine start up. When engine start up is initiated, the control unit 728 causes the start up fluid admission control valve 740 to open and the start up pump 797 to be started. The start up pump 797 raises the pressure of the relatively lower pressure water from the second reservoir 790 and pumps it into the cylinder 712 through the start up fluid admission control valve 740. The cylinder 712 contains a first fluid mass 1022 comprising aspirant air and a second fluid mass 1024 comprising the inflowing pressurised water and any water residue in the cylinder 712 at start up. As the second fluid mass 1024 fills the cylinder 712, the first fluid mass 1022 is compressed so raising its pressure and temperature. When signals from the sensor 744 indicate that the pressure of the first fluid mass 1022 is at a predetermined level, the control unit 728 signals the start up admission control valve 740 to close and deactivates the start up pump 797. In this embodiment, the first fluid mass 1022 is pressurised to a pressure at which the fuel used by the engine will spontaneously ignite when injected into the cylinder 712.

Figure 18:
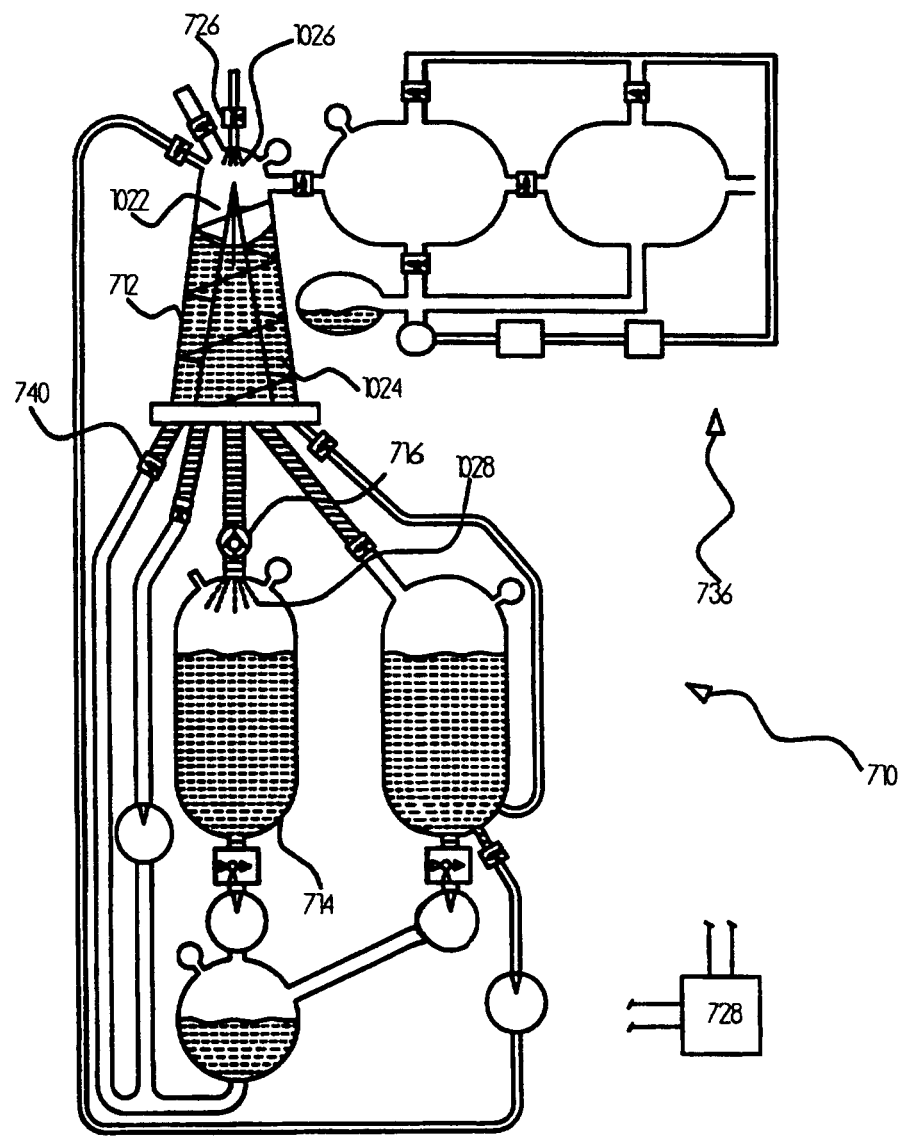
FIG. 18 is a view corresponding to FIG. 17 illustrating fuel delivery and fluid output from a combustion chamber of the internal combustion engine to a reservoir.

Referring to FIG. 18, once the start up admission valve 740 has closed, the control unit 728 initiates a combustion event by signalling the fuel injector 726 to open and inject fuel 1026 into the first fluid mass 1022. As the fuel 1026 mixes with the hot compressed air, the fuel ignites and combustion takes place causing a rapid pressure increase in the cylinder 712. The pressure in the cylinder 712 is such that apart from localised steam formation at the interface between the two fluid masses 1022, 1024, there is no change in state of the water, which remains in liquid form.

The rapid pressure increase in the cylinder 712 following the start of the combustion event alters the pressure balance acting on the output valving 716. The output valving 716 responds by opening to allow a pressure wave generated by the rapidly expanding combustion gases to drive a portion of the second fluid mass 1024 out of the cylinder into the first reservoir 714 to provide a flow of energised fluid in the form of a relatively high velocity stream of water 1028.

Figure 19:
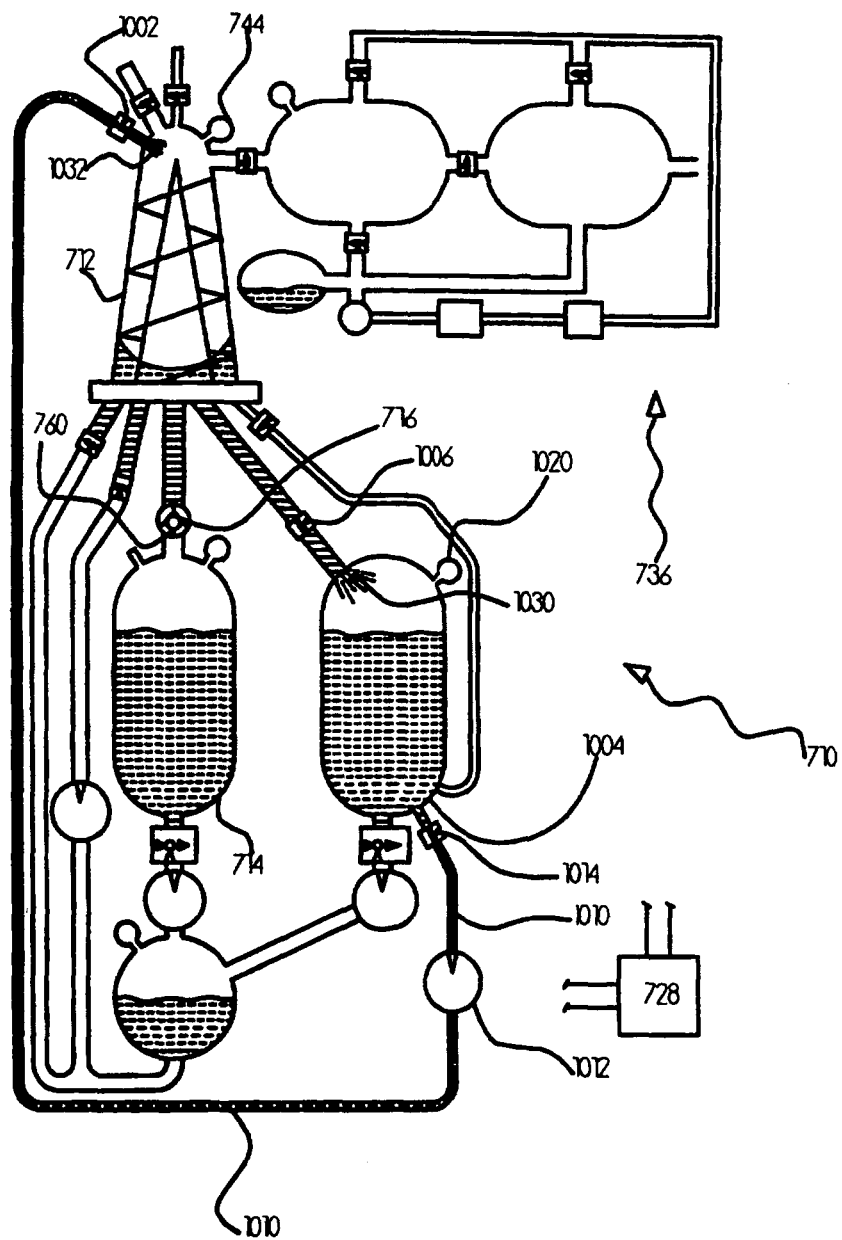
FIG. 19 is a view corresponding to FIG. 17 illustrating fluid output from the combustion chamber to another reservoir and the injection of fluid from that reservoir into the combustion chamber.

Referring to FIG. 19, once the output valving 716 has opened and the flow of water 1028 into the first reservoir 714 has commenced, the pressure in the cylinder 712 rapidly decreases. This is reflected in the pressure indicating signals received by the control unit 728 from the sensor 744 and once the pressure has fallen below a predetermined level, the control unit 728 signals the valve 1006 between the cylinder 712 and third reservoir 1004 to open. The opening of the valve 1006 allows water 1030 to flow from the cylinder 712 into the third reservoir 1004. This causes a further decrease in the pressure in the cylinder 712, which rapidly results in the ball 760 of the output valving 716 moving back into sealing contact with its valve seat under the influence of the relatively higher pressure in first reservoir 714 (and, if present, the return bias member). The pressure drop in the cylinder 712 eventually reaches a point at which steam starts to form. The steam pressure maintains the flow of heated water into the third reservoir 1004 thereby increasing the pressure in the reservoir.

At about the time the valve 1006 is signalled to open, the control unit 728 signals the second hot water admission valve 1002 and the outlet valve 1014 to open and activates the pump 1012. This results in heated water from the third reservoir 1004 being pumped through the outlet ducting 1010 and exiting the second hot water admission valve 1002 into the cylinder 712. The second hot water admission control valve 1002 is configured to output the heated water as atomised droplets to provide a fine mist of heated water droplets in the cylinder 12. The combustion heat still present in the cylinder 712 vaporises the hot water droplets 1032 as it is sprayed into the cylinder producing yet more steam. The steam produced forces more hot water to flow into the third reservoir 1004. The control unit 728 monitors the respective pressures in the cylinder 712 and third reservoir 1004 using pressure indicating signals provided by the sensors 744, 1020. Once the pressure in the cylinder 712 has fallen to a level near that in the third reservoir 1004, the control unit 728 signals the valves 1002, 1006, 1014 to close.

Figure 20:
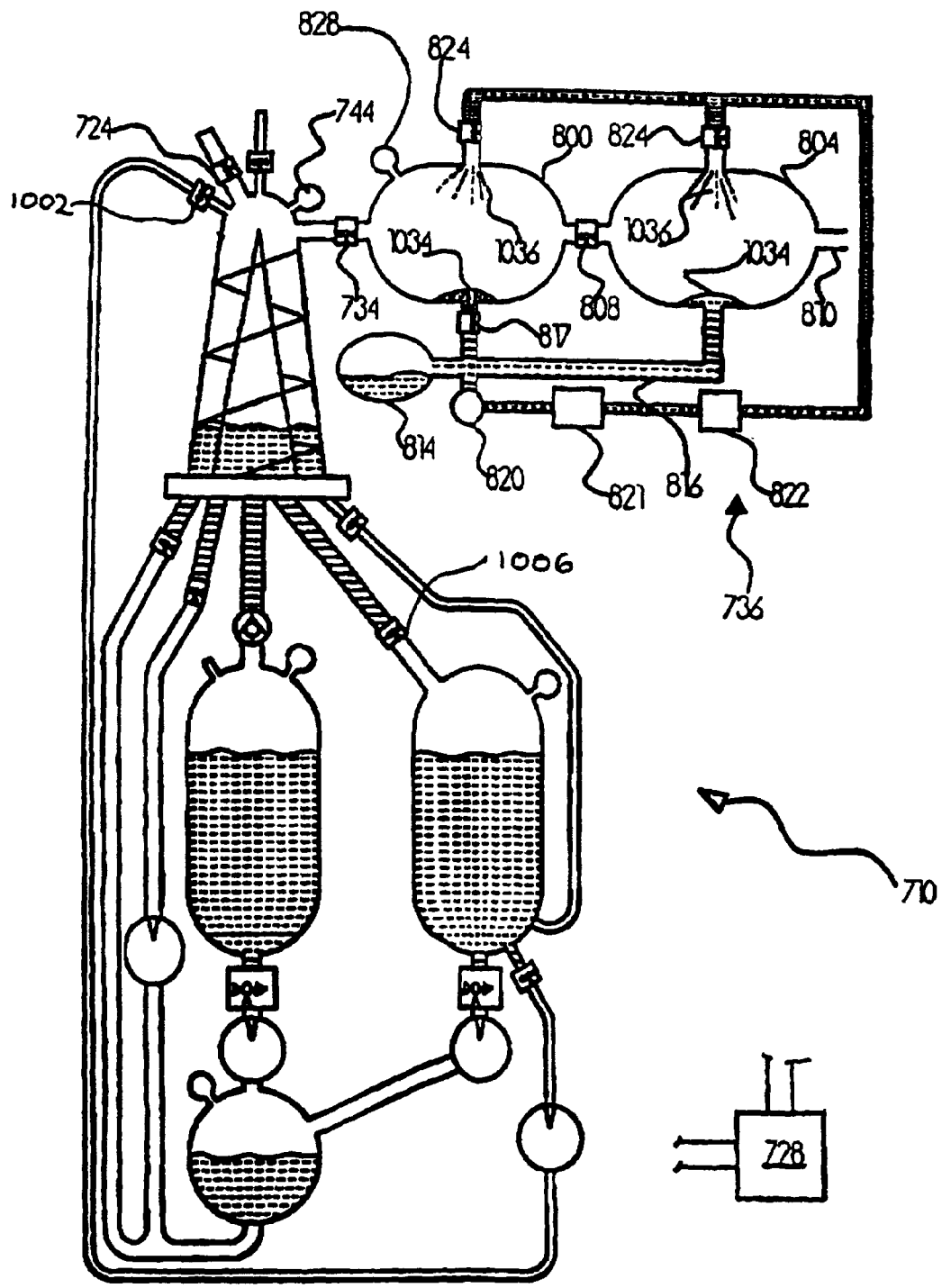
FIG. 20 is a view corresponding to FIG. 17 illustrating the first stages of an exhaust process.

Referring to FIG. 20, at this stage the pressure in the cylinder 712 is still relatively high and the exhaust process commences. With the valves 1002, 1006, now closed, the control unit 728 signals the exhaust valve 734 to open to allow exhaust gases to flow from the cylinder 712 into the first condenser 800. Except at start up when the pressure may be close to atmospheric, there will be a partial vacuum in the first condenser 800. For the avoidance of doubt, at this stage, the valves 808, 817, 824, are closed so the first condenser 800 is isolated from all external pressures except the pressure in the cylinder 712. The exhaust gases in the cylinder 712 rapidly exhaust into the first condenser 800 reducing the pressure in the cylinder and raising the pressure in the first condenser.

The first condenser 800 is cooled, for example, by a cooling water circuit, to cause the water vapour in the exhaust gases to condense and form a pool 1034 at the bottom of the condenser. Additionally, the control unit 728 signals the valves 824 to open and the water pump 820 to start pumping water from the reservoir 814 through the cooling radiator 821 and, when provided, the chiller unit 822. The cooled water passes along the ducting 818 into the first and second condensers 800, 804 as a cooled water spray 1036. The water spray 1036 in the first condenser 800 assists in causing the water vapour in the exhaust gases to condense. The cooled water spray into the second condenser 804 pre-cools the condenser.

When the pressure in the cylinder 712 and first condenser 800 has substantially equalised, as indicated by pressure indicating signals from the sensors 744, 828, the control unit 728 signals the valve 808 between the first and second condensers 800, 804 to open. The cylinder 712 is then open to atmospheric pressure at the exhaust outlet 810. As a result, the exhaust gases flow through the first and second condensers 800, 804 to atmosphere. Further cooling of the exhaust gases in the first and second condensers 800, 804 condenses the water vapour in the exhaust gases. When the pressure in the first condenser 800 has fallen to a sufficiently low level, indicated by signals from the sensors 744, 828, the control unit 728 signals the valve 817 to open. Condensate from the pools 1034 that form at the bottom of the condensers 800, 804 flows from the condensers to the reservoir 814 via the ducting 816.

When the pressure in the cylinder 712 and first condenser 800 has reached atmospheric pressure or another predetermined level, indicated by pressure indicating signals from the sensors 744, 828, the control unit 728 signals the valves 808, 817 to close. The cooled water spray 1036 into the condensers 800, 804 continues. The cooled water spray into the first condenser 800 causes further cooling and a rapid pressure drop that produces a partial vacuum in the first condenser and cylinder 712. Once the pressure in the first condenser has reached a predetermined level, indicated by signals from the sensor 828, the control unit 728 signals the exhaust valve 734 and the valves 824 to close isolating the partial vacuum for the next cycle.

Figure 21:
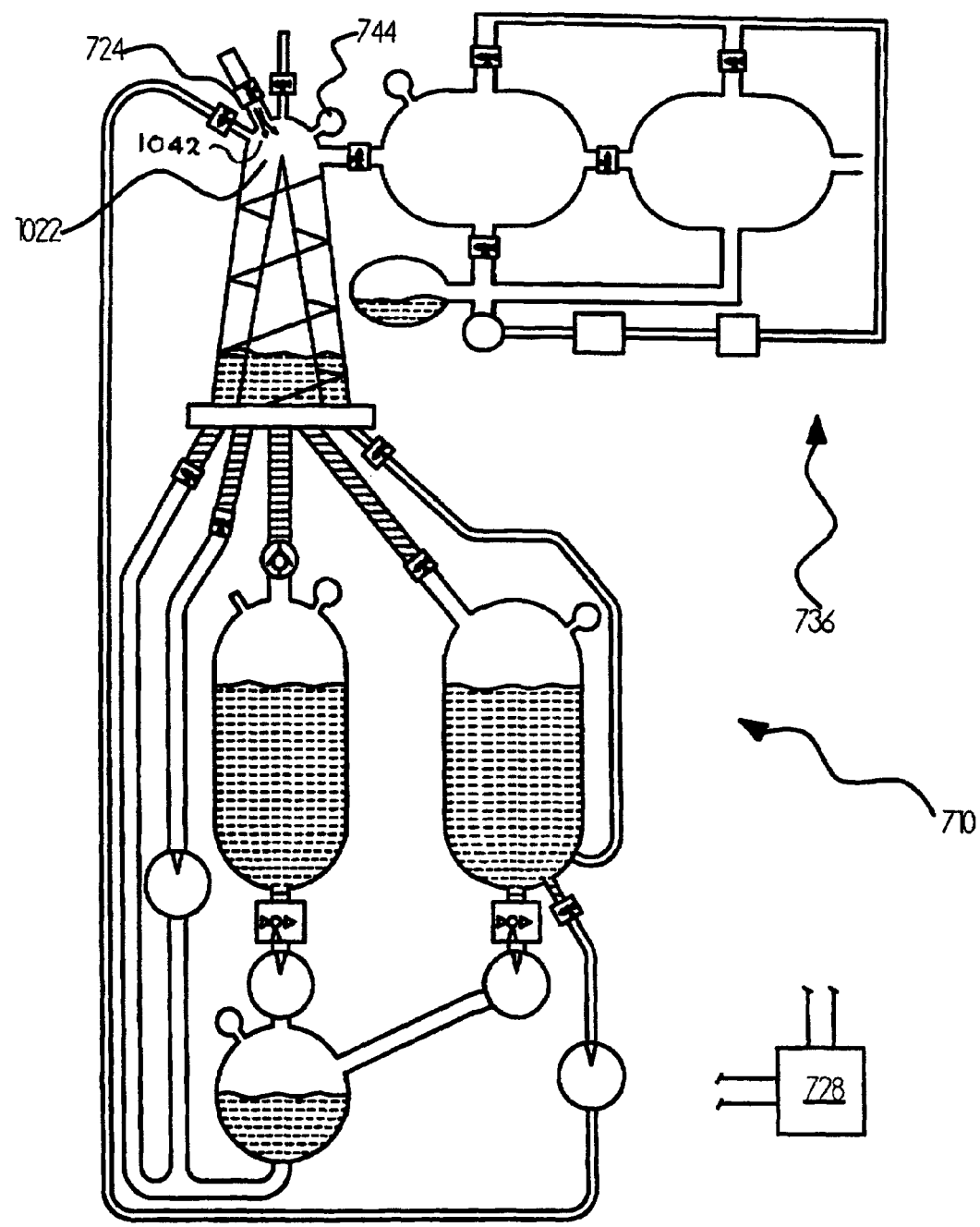
FIG. 21 is a view corresponding to FIG. 17 illustrating air intake into the combustion chamber.

Referring to FIG. 21, the control unit 728 initiates a new combustion cycle by signalling the air intake valve 724 to open. When the air intake valve 724 opens, aspirant air (indicated by arrows 1042) is sucked into the cylinder 712 to replace the vacuum and form the first fluid mass 1022.

Figure 22:
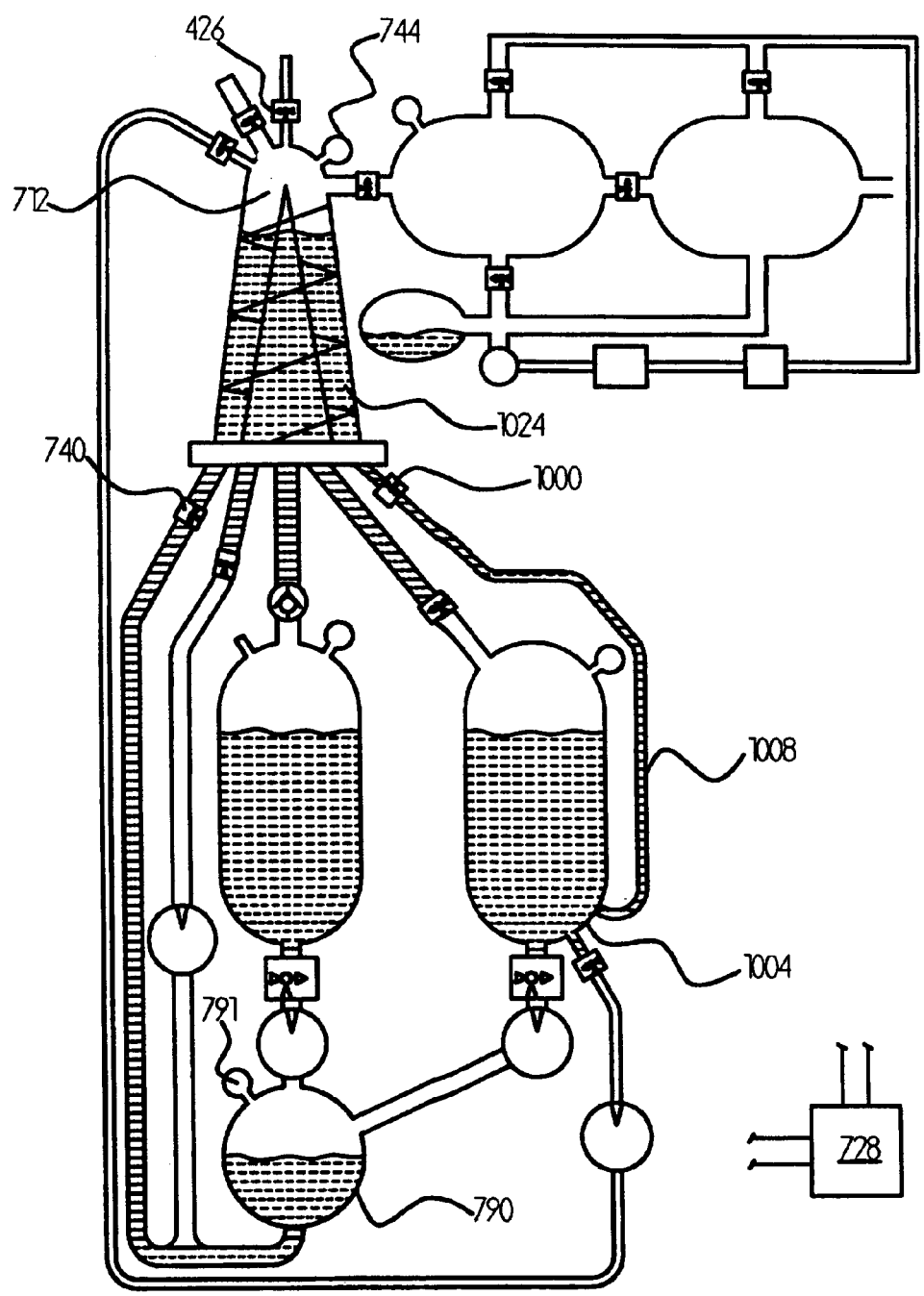
FIG. 22 is a view corresponding to FIG. 17 illustrating operation of the internal combustion engine during a compression process.

Referring to FIG. 22, when pressure indicating signals from the sensor 744 indicate that the pressure in the cylinder 712 is at atmospheric pressure (or another predetermined pressure), the air intake valve 724 is closed and the fluid admission control valve 740 is signalled to open and allow water from the second reservoir 790 to flow into the cylinder 712 to form the second fluid mass 1024 and pressurise the first fluid mass 1022. Once the pressure in the second reservoir 790 and cylinder 712 has equalised, as indicated by signals from the sensors 744, 791, the control unit 728 signals the fluid admission control valve 740 to close. If the pressure indicating signals from the sensor 744 indicate that the pressure in the cylinder 712 has not been raised to a predetermined level that is judged necessary for spontaneous ignition to occur, the control unit 728 signals the first hot water admission control valve 1000 to open and allow pressurised water from the third reservoir 1004, which is at a much higher pressure than the water in the second reservoir 790, to flow through the outlet ducting 1008 into the lower end of the cylinder 712. Once the pressure indicating signals from the sensor 744 indicate that the pressure in the cylinder 712 has reached the level required for spontaneous ignition, the control unit 728 signals the first hot water admission control valve 1000 to close. At this stage, the first fluid mass 1022 is pressurised and ready for the injection of fuel from the fuel injector 726 as illustrated in FIG. 18. The cylinder 712 is then cycled through the combustion and exhaust sequence previously described to maintain a desired pressure in the first reservoir 714 to match the demand input by the driver of the motor vehicle.

Figure 23:
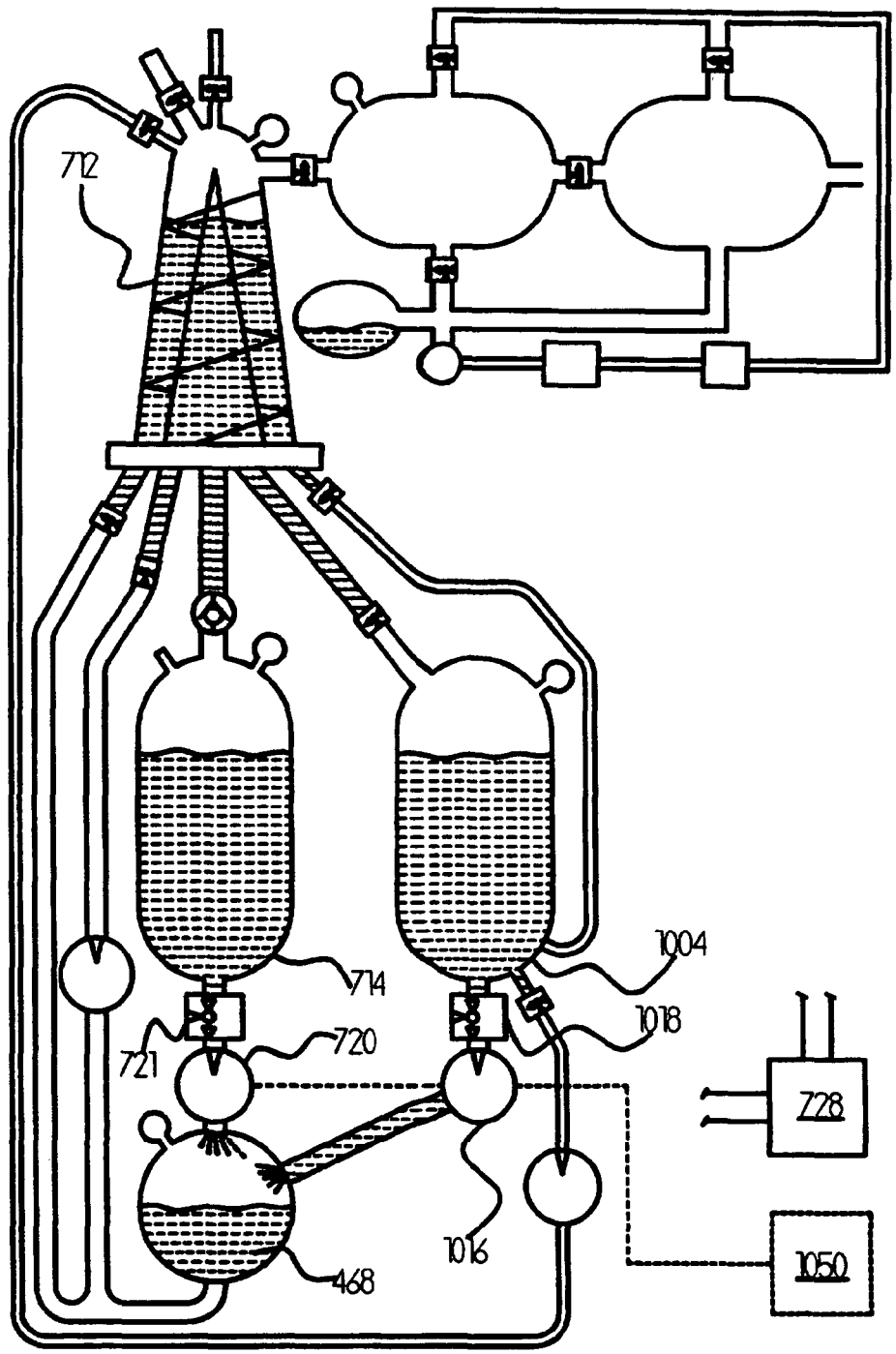
FIG. 23 is a view corresponding to FIG. 17 showing the delivery of energised fluid to the drive units.

Referring to FIG. 23, the control valves 721, 1018 of the first reservoir 714 and third reservoir 1004 are shown open to allow energised fluid to flow to the primary and secondary drive units 720, 1016 respectively. The two drive units 720, 1016 convert energy stored in the water output from the first and third reservoirs 714, 1004 into a force that is used to drive the wheels of the motor vehicle (not shown). The control valves 721, 1018 open and close in response to signals from the control unit 728, or another engine control unit, which signals are produced in response to demand input by the driver.

Much of the heat produced during the operation of conventional CI and SI combustion engines has to be lost through cooling processes and some is lost in the exhaust stream. Those cooling processes often involve the use of a fan connected to an output shaft of the engine, which itself absorbs some of the output power of the engine. Some estimates put the energy wasted in this way at 36% of the fuel energy input to the engine or around 75% of the heat produced. It will be understood that the processes incorporated in the illustrated embodiments harvest at least some of this wasted energy and it is envisaged that as a result such engines will be considerably more energy efficient than a conventional internal combustion engine. Apart from allowing for better fuel consumption and the use of physically smaller engines for a given power requirement, such efficiency should make it possible to provide a motor vehicle with onboard hydrogen extraction apparatus to produce hydrogen to fuel the engine.

As shown in FIG. 23, the secondary drive unit 1016 may optionally be connected to a hydrogen extraction apparatus 1050 (indicated by dashed lines). The hydrogen extraction apparatus 1050 can be any suitable conventional hydrogen extraction apparatus. The hydrogen extraction apparatus 1050 may be driven by a mechanical force output by the secondary drive unit 1016. Alternatively, the hydrogen extraction apparatus 1050 could be powered with electricity generated by an electricity generating device driven by the torque output of the secondary drive unit. Yet another alternative would be to supply fluid from the third reservoir 1004 to a drive unit that forms a part of the hydrogen extraction apparatus.

One suitable hydrogen extraction apparatus 1050 comprises a set of fuel cells that contain pellets made of aluminium and gallium alloy. When water is pumped through the fuel cells and contacts the pellets, hydrogen is generated spontaneously by splitting the water molecules and can be fed directly to the engine without the need of storage reservoirs. The aluminium pellets react to the incoming water because aluminium is strongly attracted to the oxygen and are gradually consumed and have to be replaced. However, the process does not give off any toxic fumes and the gallium pellets can be recycled over and over again.

It will be appreciated that if the internal combustion engine is to use hydrogen as a fuel, producing the hydrogen onboard on demand saves on the need for storage tanks for the hydrogen, which usually needs to be liquefied. Such storage takes up a lot of space and there is the further disadvantage that the stored hydrogen is highly flammable. It will be understood that if no hydrogen storage capacity is provided, a hybrid arrangement can be used with a fuelling system for supplying ethanol, petrol (gasoline) or the like provided for engine startup. It will also be appreciated that the extraction of the hydrogen from the water provides a supply of oxygen that could be used to aspirate the engine such that the combustion chamber is aspirated by oxygen only or by an oxygen enriched air supply.

It will be appreciated that in embodiments that utilise hydrogen as the fuel, there will be no fuel for steam reformation. In view of the speed and ferocity with which hydrogen burns, sufficient heat may be developed to achieve thermolysis without steam reformation. However, it may be desirable in such cases to add a small amount of a fuel that can produce steam reformation to the hydrogen-air mixture. The fuel could be added prior to combustion or during combustion using a system similar to or the same as the system 280 illustrated in FIG. 15.

A modification to the internal combustion engine 710 will now be described with reference to FIG. 24. To avoid repetition of description, like parts are given the same reference numeral as in FIGS. 17 to 23. The modified internal combustion engine 1110 shown in FIG. 24 differs from the internal combustion engine 710 shown in FIGS. 17 to 23 in that the air intake system includes a supercharger 1060 located upstream of the air intake valve 724 and the cylinder 712 is provided with a device 1062 for detecting when the level of the second fluid mass 1022 reaches a required level in the cylinder. The level detecting device 1062 can be any form of sensor device suitable for detecting a liquid level in a high temperature and pressure environment and may be an optical sensor.

The operation of the modified internal combustion engine 1110 differs from that of the internal combustion engine 710 in the exhaust and air intake processes. Since the operations of the internal combustion engine remain unchanged, only the exhaust and air intake processes will be described.

At the start of the exhaust process the valves 734, 808, 817, 824 are closed. The exhaust process commences with the opening of the exhaust valve 734. The control unit 728 signals the valves 824 to open and the pump 820 to commence pumping to provide cold water sprays 1036 in the condensers 800, 804. Again as previously described, a pool of condensate 1034 will form in the bottom of the first condenser 800 and subsequently the valves 808, 817 are opened. When the pressure in the cylinder 712 reaches a predetermined level, indicated by signals from the sensor 744, the control unit 728 signals the fluid admission control valve 742 to open to allow relatively low pressure water from the second reservoir 790 to flow into the cylinder to form the second fluid mass 1024. The inflowing water displaces exhaust gases from the cylinder 712 into the exhaust system 736. When signals from the level detecting device 1062 indicate that the second fluid mass 1024 has reached the required level, the control unit 728 signals the fluid admission control valve 742 to close.

As the fluid admission control valve 742 is signalled to close, the control unit 728 signals the air intake valve 724 to open and the supercharger 1060 to commence operation. The supercharger 1060 blows high pressure air into the cylinder 712. Shortly after signalling the air intake valve 724 to open, the control unit 728 signals the exhaust valve 734 to close. The overlap of the opening of the air intake valve 724 and closing of the exhaust valve 734 is set such that the air blown into the cylinder 712 drives the remaining exhaust gases from the cylinder into the exhaust system 736.

The air intake valve 724 remains open subsequent to closure of the exhaust valve 734 to allow the supercharger 1060 to deliver a mass of high pressure air to form the first fluid mass 1022 at a pressure sufficiently high for spontaneous ignition to occur when fuel is injected into the cylinder.

In the modified internal combustion engine 1110 using inflowing water from the second reservoir 790 and high pressure air from the supercharger 1060 to drive the exhaust gases from the cylinder 712 results in a lesser degree of cooling. A potential advantage of the use of the supercharger 1060 is that it makes it relatively easy to adjust the set pressure of the first fluid mass 1022 to a level suitable for producing spontaneous ignition when using different types of fuel. Accordingly, the engine's standard operating settings readily can be adjusted to allow it to run on different fuels.

An internal combustion engine 1210 that is a modification of the internal combustion engine 1110 shown in FIG. 24 will now be described with reference to FIGS. 25 to 27. To avoid repetition of description, like parts are given the same reference numeral as in FIG. 24.

Figure 24:
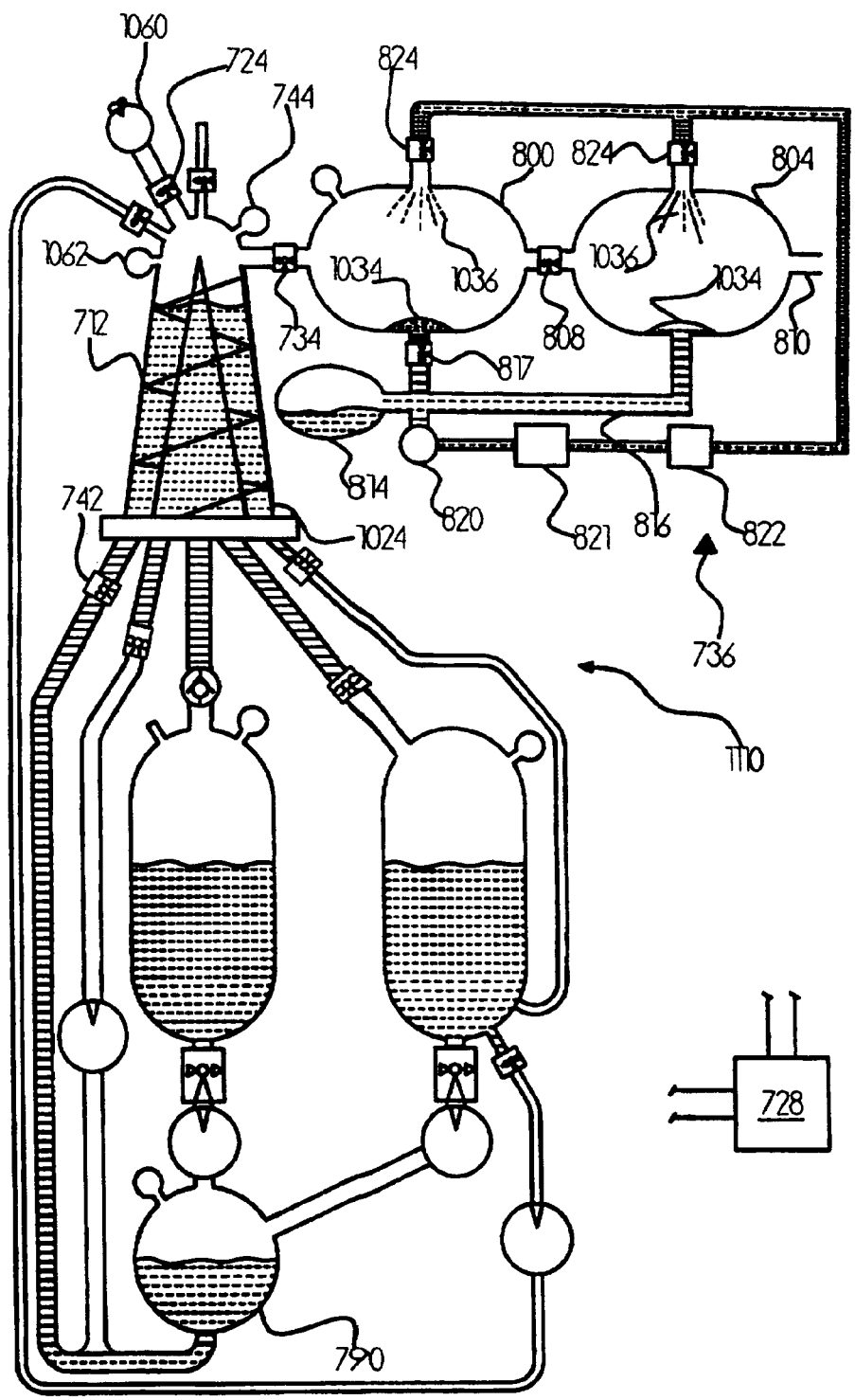
FIG. 24 illustrates a modification of the internal combustion engine of FIGS. 17 to 23.

The internal combustion engine 1210 differs from the internal combustion engine 1110 of FIG. 24 in that the cylinder is provided with a constriction adjacent its upper end at which a valve 1212 is located and that there are two exhaust valves 1214, 1216 and a combustion initiator in the form of a spark plug 1218.

Figure 25:
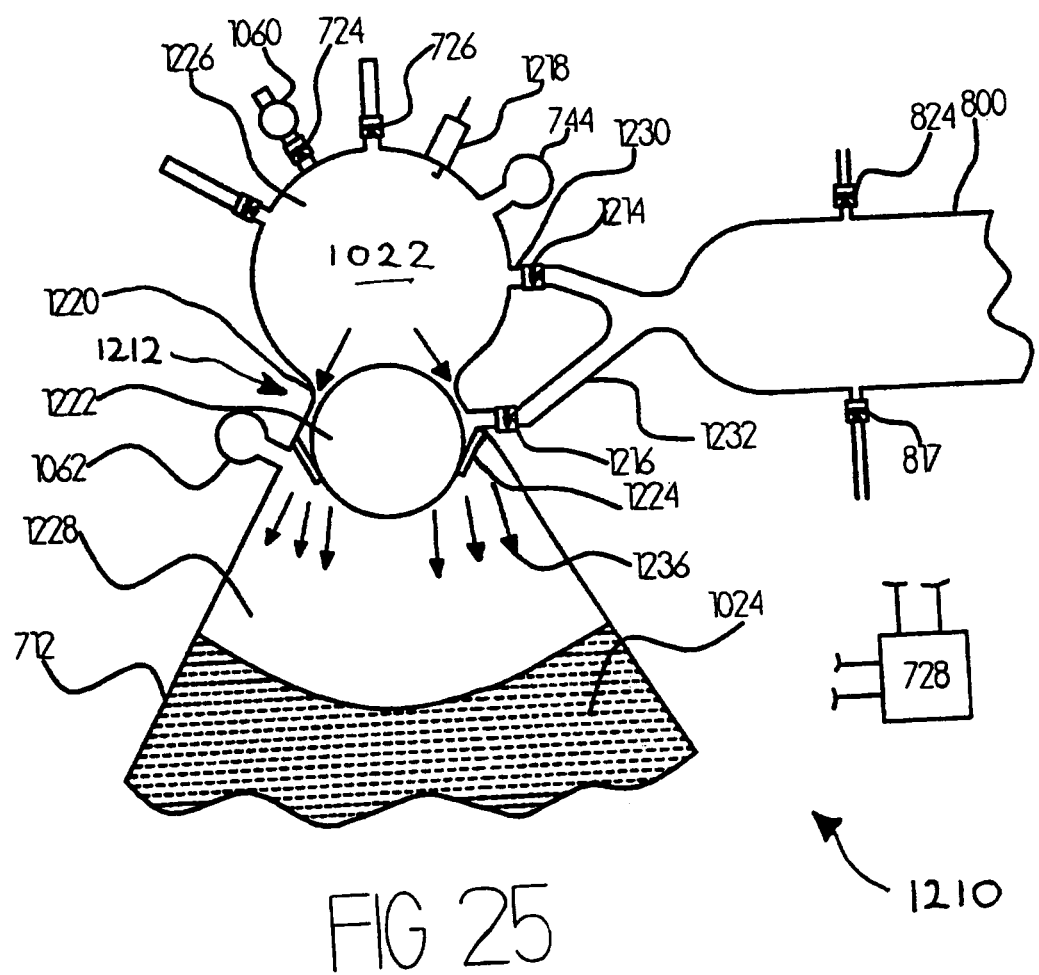
FIG. 25 shows another modification to the internal combustion engine of FIG. 24 during a combustion process.

Referring to FIG. 25, the valve 1212 comprises a valve seat 1220 and a displaceable valve member in the form of a ball 1222. The valve seat 1220 may be defined by the wall of the cylinder 712 that defines the constriction or by one or more members fitted to the cylinder wall. The ball 1222 may advantageously be made of a relatively low density material and/or be hollow in order to improve its responsiveness to changes in the forces acting on it. The valve 1212 is provided with a retaining device 1224 for limiting movement of the ball 1222 away from the valve seat 1220. The retaining device 1224 may be of any suitable form for limiting movement of the ball 1222 away from the valve seat 1220 while allowing relatively free flow of fluids past the ball towards the lower end of the cylinder and being able to withstand the pressure and temperatures that will encountered when the internal combustion engine 1210 is in use. The retaining device 1224 may, for example, be similar to any one of the retaining devices described in connection with FIG. 2. The valve 1212 may also include a biasing device (not shown) that biases the ball into engagement with the valve seat 1220. The biasing device may, for example, comprise a compression spring located between the ball 1222 and retaining device 1224. As an alternative to a one-way pressure actuated valve as shown in FIG. 25, the valve 1212 may comprise an electrically actuated valve that opens and closes in response to signals from, for example, the control unit 728.

When closed, the valve 1220 separates the cylinder into a first portion, or sub-chamber 1226, and a second portion, or sub-chamber 1228. The two exhaust valves 1214, 1216 are located in bifurcated ducting that connects the cylinder 712 to the first condenser 800 of the exhaust system 736. The uppermost exhaust valve 1214 is provided in an arm 1230 of the ducting that is in flow communication with the first sub-chamber 1226 and the lowermost exhaust valve 1216 is provided in an arm 1232 of the ducting that is in flow communication with the second sub-chamber 1228.

The spark plug 1218 is located at the upper end of the cylinder 712 adjacent the fuel injector 726 such that it can discharge into the first sub-chamber 1226.

In use, shortly prior to the initiation of a combustion event, the ball 1222 is seated against the valve seat 1224 so that the first sub-chamber 1226 is isolated from the second sub-chamber 1228. At this stage, the first sub-chamber 1226 is filled with pressurised air that is the first fluid mass 1022 and the second sub-chamber 1228 is charged with water up to a level set by the level sensor 1062. The fuel injector 726 operates under control of the control unit 728 to inject fuel into the first sub-chamber 1226 where the fuel mixes with the air that is the first fluid mass 1022 to form a combustible mixture. At a preset interval after the opening of the fuel injector 726, the control unit 728 signals the spark plug 1218 to discharge into the combustible mixture to initiate combustion. When the mixture combusts there is a rapid pressure increase in the first sub-chamber 1226 that causes the ball 1222 to move away from the valve seat 1220 allowing the hot, rapidly expanding, combustion gases 1236 to rush past into the second sub-chamber 1228 to provide a pressure wave that drives against the water forming the second fluid mass 1024 to provide an engine output in the form of a flow of energised water as previously described.

Figure 26:
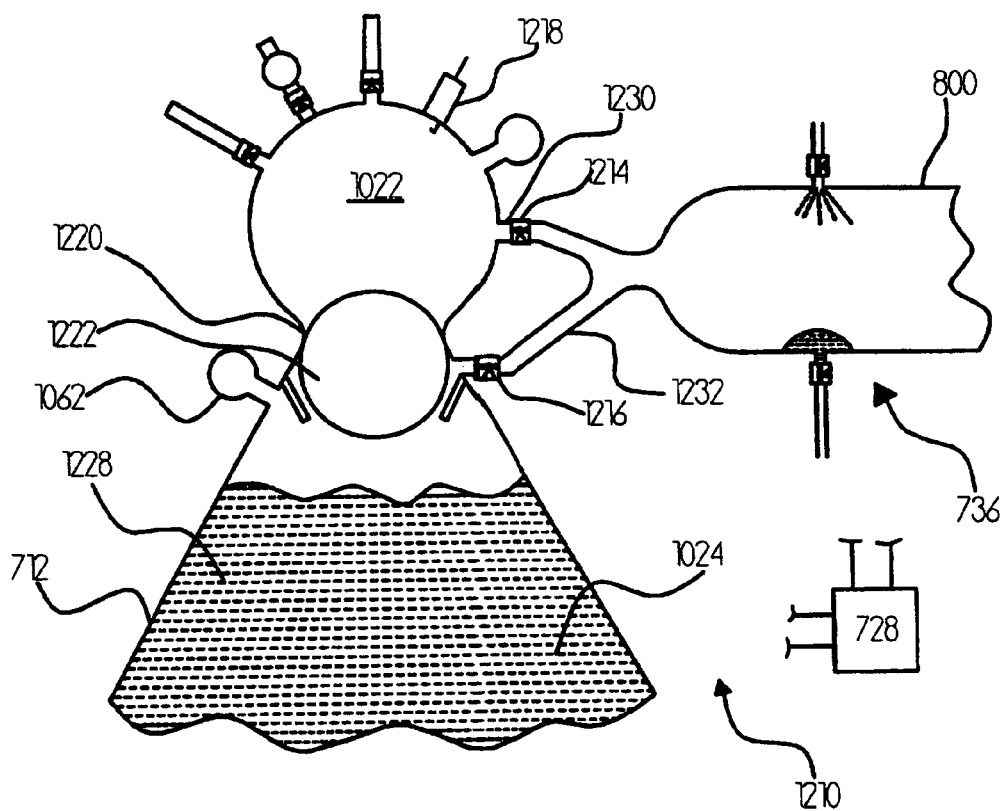
FIG. 26 shows the internal combustion engine of FIG. 25 during a first stage of an exhaust process

Referring to FIG. 26, the exhaust process commences with the control unit 728 signalling the exhaust valves 1214, 1216 to open to allow combustion products to be driven from the first and second sub-chambers 1226, 1228 by the inflowing water from the second reservoir that forms the second fluid mass 1024. The combustion products from the second sub-chamber 1228 flow through the arm 1232 of the ducting and into the first condenser 800 of the exhaust system 736. The increasing water level in the cylinder 712 caused by the inflowing water (and where provided the biasing force provided by the biasing device) cause the ball 1222 to move back into engagement with the valve seat 1224 such that the first sub-chamber 1226 is again isolated from the second sub-chamber 1228.

Figure 27:
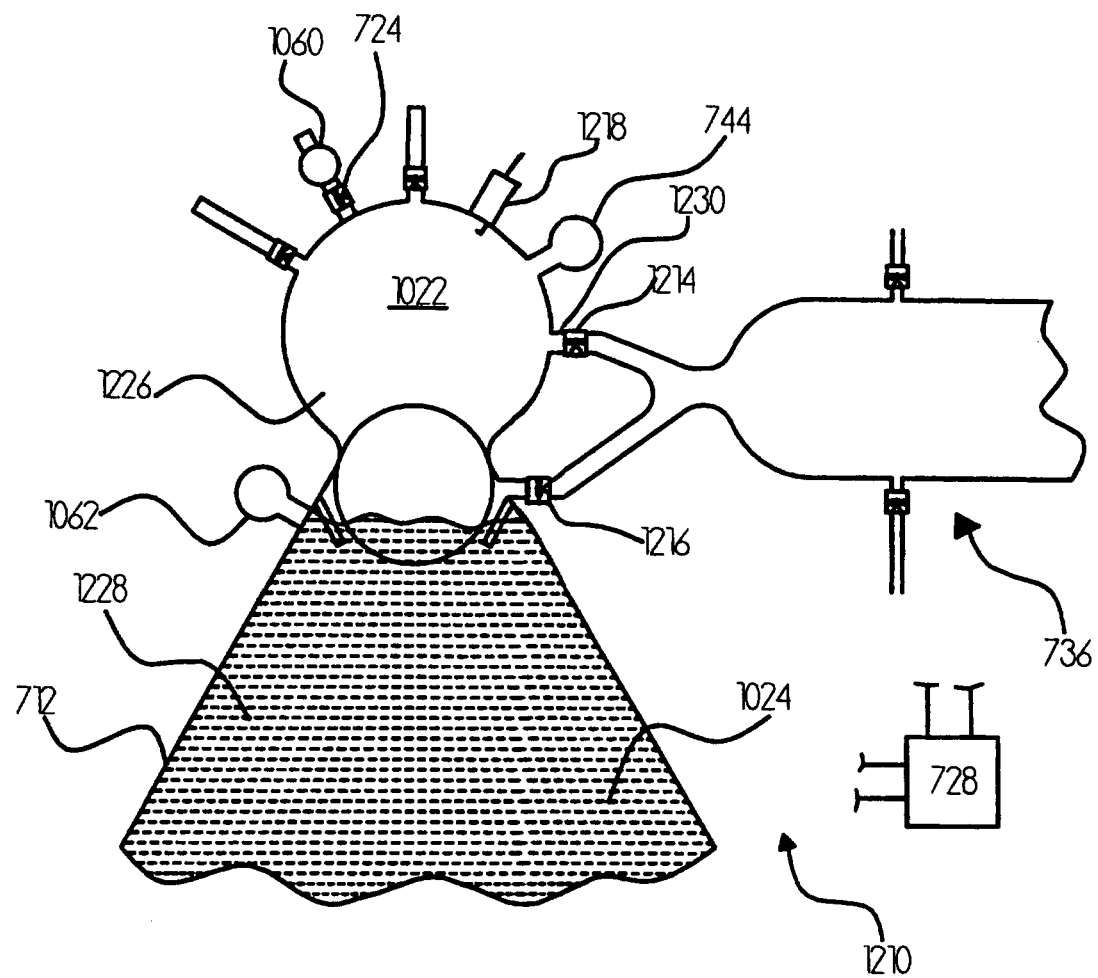
FIG. 27 shows the internal combustion engine of FIG. 25 during a second stage of the exhaust process.

Referring to FIG. 27, when the inflowing water that forms the second fluid mass 1024 has reached a required level, as indicated by signals from the level sensor 1062, the control unit 728 signals the lowermost exhaust valve 1216 to close. With the uppermost exhaust valve 1214 still open, combustion products from the first sub-chamber 1226 can still flow along the arm 1230 of the ducting and into the first condenser 800 of the exhaust system 736. At the same time, or shortly after, the closing of the lowermost exhaust valve 1214, the control unit 728 signals the air intake valve 724 to open allowing pressurised air from the supercharger 1060 to flow into the first sub-chamber 1226. The inflowing air drives any remaining combustion products from the first sub-chamber 1226 through the uppermost exhaust valve 1214 into the exhaust system. Shortly after the opening of the air intake valve 724, the control unit 728 signals the uppermost exhaust valve 1214 to close and the charging of the first sub-chamber 1226 with the air that forms the first fluid mass 1022 is completed to a required pressure indicated by signals from the sensor 744. At this stage, the cylinder 712 is ready to receive fuel via the fuel injector 726.

It will be appreciated that the presence of the valve 1212 separating the first sub-chamber 1226 from the second sub-chamber 1228 allows the spark plug 1218 to operate in a relatively dry environment, thereby reducing the likelihood of misfires. It will also be appreciated that since a combustion initiator is provided, the internal combustion engine 1210 may not require supercharging, although, it is envisaged that a supercharger 1060 will still be used in order to enhance the performance of the engine. It will also be understood that although only one spark plug 1218 is shown, additional spark plugs may be provided in order to improve the combustion process.

Because the internal combustion engines of the illustrated embodiments do not have pistons or rotors that need to seal against the combustion chamber walls, the walls of the combustion chambers do not need to have smooth surfaces.

Figure 28:
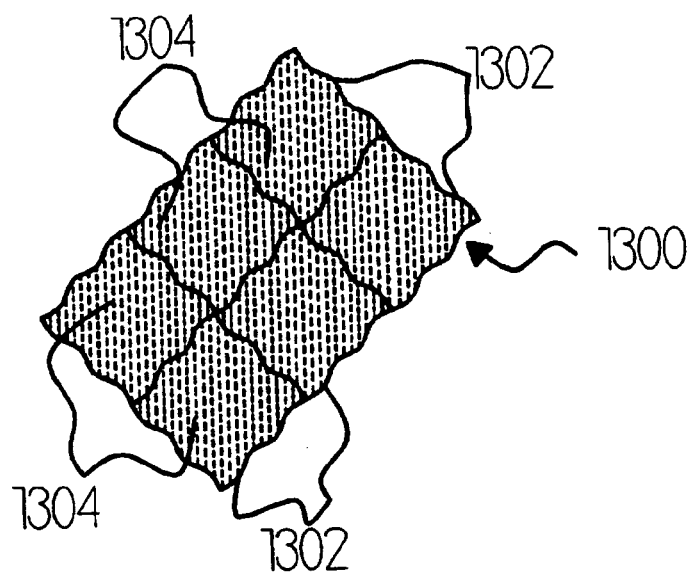
FIG. 28 illustrates surface roughening that can be provided on a combustion chamber wall of the internal combustion engines of FIGS. 1 to 27.

Accordingly, the surfaces can be made rough so as to reduce drag between the rapidly moving fluids and those surfaces. The surface roughening can take any suitable form. One possibility is to provide the combustion chamber walls with a ribbed surface modelled on sharkskin. As shown in FIG. 28, a surface 1300 modelled on sharkskin may comprise a plurality of tooth-like platelets 1302 formed with ridges 1304. In the illustrated embodiment, the ridges 1304 are generally aligned and the surface is formed such that the ridges extend in the general direction of flow of the fluids. For the embodiments illustrated in FIGS. 1 to 27, the ridges 1304 would be arranged to follow the spiral flow path defined by the spiral passages 164, 864. It may also be desirable to provide surface roughening on the parts defining the spiral passages 164, 864. Alternatively, the ridges 1304 could be arranged such that the ridges of adjacent platelets 1302 extend in different directions. This may be beneficial in terms of breaking up the boundary layer and improving fluid flow in the cylinder.

Figure 29:
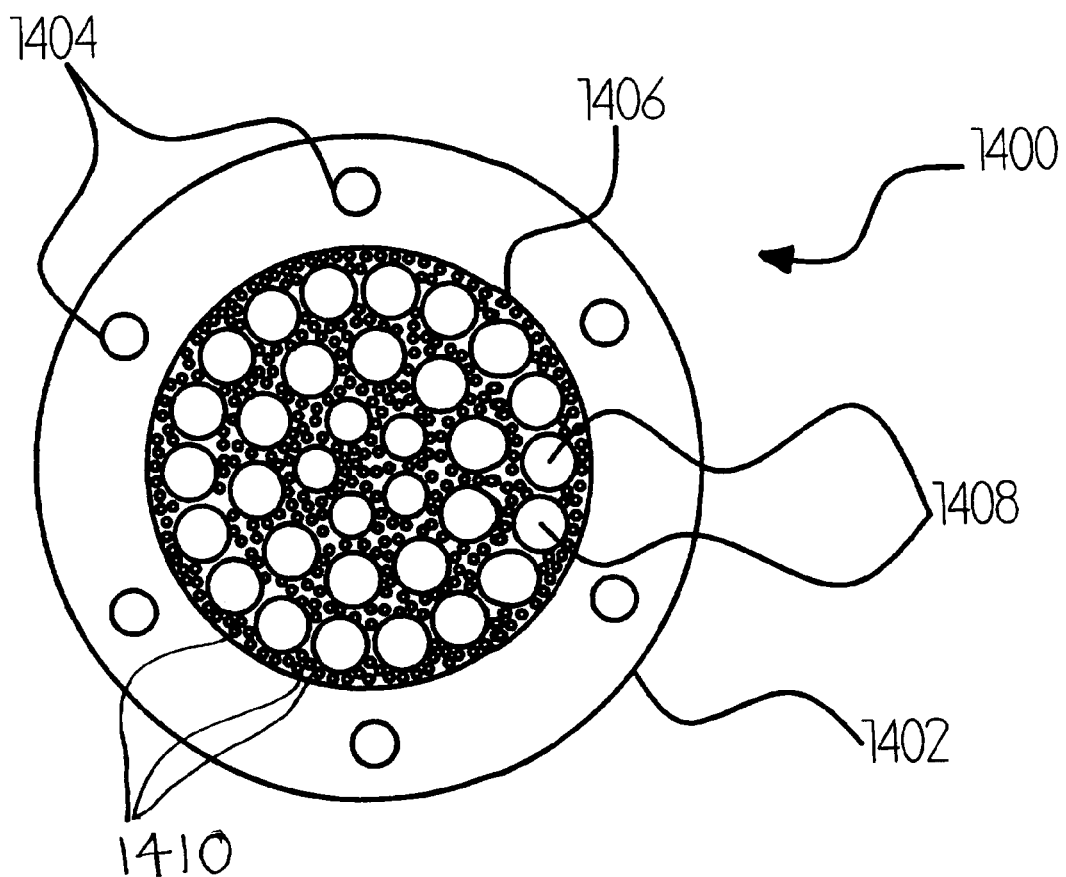
FIG. 29 shows a fluid holder that can be used in the internal combustion engines shown in FIGS. 1 to 24.

FIG. 29 illustrates a fluid holder 1400 that can be used in internal combustion engines having structures such as those shown in FIGS. 1 to 24. Referring to FIG. 4, the fluid holder 1400 is intended to be sandwiched between the main body portion 150 and domed cylinder head 154. The fluid holder 1400 comprises an annular support member 1402 that is provided with circumferentially equi-spaced through holes 1404 for receiving devices, such as the bolts 158 that are used to secure the domed cylinder 154 head to the main body portion 150. The annular support member 1402 supports a fluid holding portion 1406. The fluid holding portion 1406 comprises a plurality of fluid holding members 1408 interconnected by support members 1410. In the illustrated embodiment the support members 1410 are a mesh structure, although, any suitable arrangement of support members can be used. The fluid holding members 1408 are shallow dished or cup-like structures for holding fluid.

In use, aqueous fluid injected into the cylinder 12, 712 will be held by the fluid holding members 1408, which are supported by the support member 1402 such that they are at the inlet end region of the cylinder where the combustible mixture is located prior to combustion. When the combustion of the combustible mixture commences, the small pockets of aqueous fluid held by the fluid holding members 1408 are disposed within the combusting gases and exposed to the full heat of combustion. The structure of the fluid holding portion 1406 is such that it absorbs very little of the heat of combustion and the receptacles are sized such that the volume of aqueous fluid held will not have any significant cooling effect. Instead, the shallow pockets of aqueous fluid are exposed to the full heat of combustion and readily form steam for steam reformation and/or dissociation.

It will be appreciated that the fluid holder can take many forms and is not limited to the structure shown in FIG. 29. For example, the fluid holding portions could be substantially flat and/or define multiple relatively small fluid holding pockets. A substantially flat surface could be provided with fluid retention features, for example, by micro-pitting.

In the illustrated embodiment, the fluid holding members 1408 are in a common plane. As an alternative, the support members may be arranged to support the fluid holding members in different planes. This provides the possibility of having a greater density of fluid holding members provided in the combustion zone while allowing relatively free flow of combustible mixture and combusting gases within the cylinder. As an alternative, for some embodiments, multiple fluid holders 1400 could be used to provide fluid holding surfaces in different planes.

It will be understood that the arrangement of the fluid holder(s) should ideally maximise the fluid holding area while minimising the amount of the heat absorbed by the fluid holders and the obstruction to flow and/and or mixing of the combustible mixture during intake processes and/or exhaust of the products of combustion during exhaust processes and/or the expanding combustion gases during combustion of the combustible mixture.

It will be appreciated that additional benefit may be obtained by configuring surface roughening of internal walls of the cylinder adjacent the combustion zone such as to hold shallow pockets of aqueous fluid that will be exposed to the heat of combustion and form steam for steam reformation and/or dissociation.

It will be understood that having the fluid holder(s) in the cylinder allows the provision of small volumes of aqueous fluid distributed as shallow pockets or films about the combustion zone and exposed to the full heat of the combustion. The depth of the volumes of aqueous fluid should be relatively small and they should be spread widely within the combustion zone to maximise the possibility for steam reformation and/or dissociation taking place. The aqueous fluid can be input to the cylinder ahead of the compression and/or combustion processes. The aqueous fluid is preferably pre-heated by, for example, any of the methods illustrated by the embodiments. However, if the input of aqueous fluid takes place prior to the compression process, the aqueous fluid can be heated by the heat of compression during compression of the air/air-fuel mixture in the cylinder.

In some embodiments the fluid to be held by the fluid holder 1400 will be input by a valve such as the steam control valve 136 shown in FIG. 1. Alternatively, the fluid holder 1400 may be located and/or the internal combustion engine operated such that prior to combustion the fluid holder is at least partially submerged in the working fluid. When combustion takes place liquid will be retained by the fluid holder for steam reformation and/or dissociation. In this case, a hydrogen containing compound from which hydrogen is to be obtained may be included in the liquid and could, for example, be an antifreeze agent such as ethanol. It will be appreciated that the antifreeze content of the liquid can be readily monitored using known testing devices and a reservoir provided from which the antifreeze level in the liquid can be topped up to maintain a desired concentration.

Figure 30:
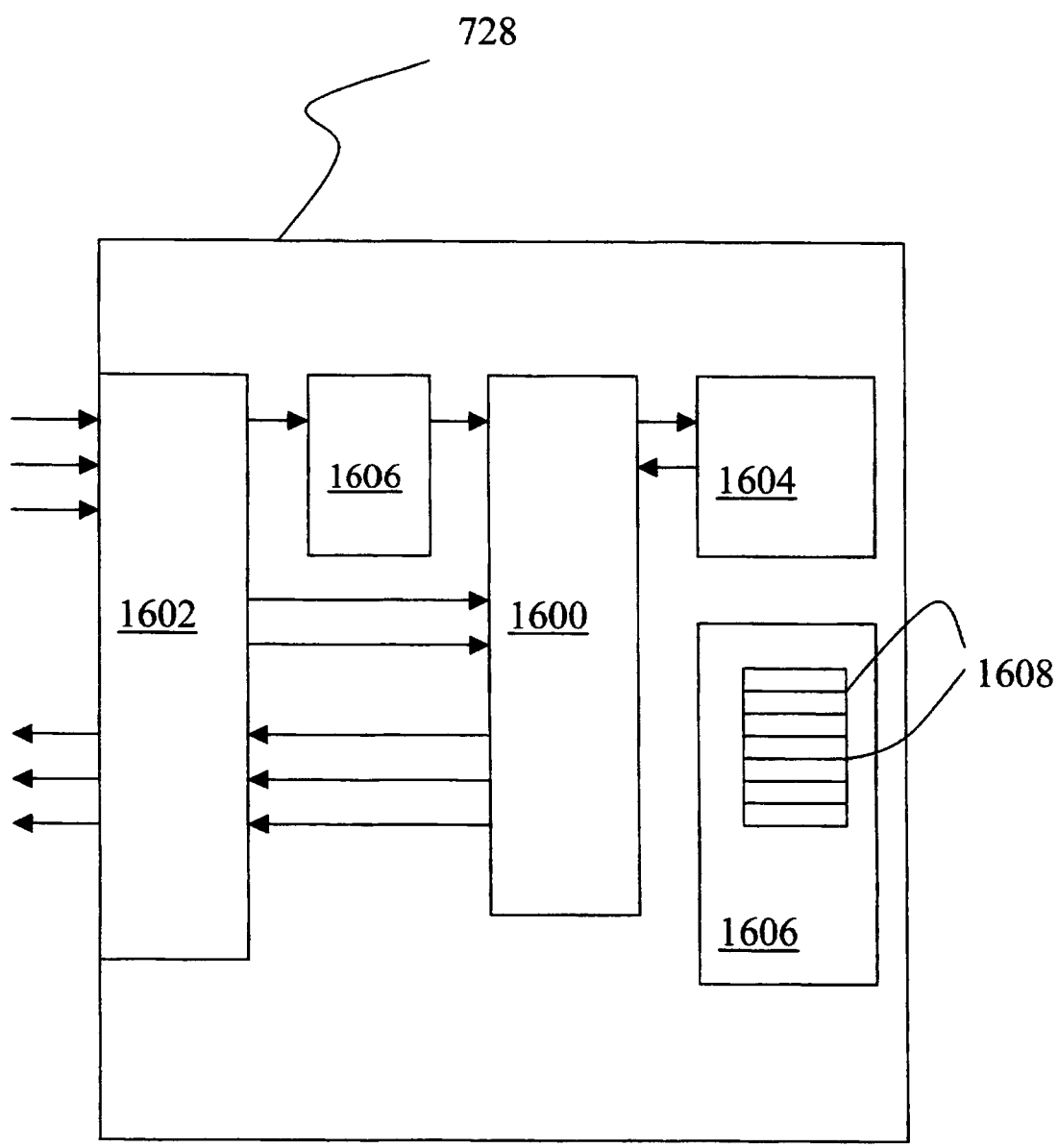
FIG. 30 is a schematic representation of an example of a control unit for the internal combustion engines shown in FIGS. 1 to 27.

In the preceding description the control unit(s) have not been described in any great detail since suitable control units and any required associated ancillary equipment are components that will be well known to those skilled in the art. Referring to FIG. 30, a suitable control unit 728 may comprise one or more a processors 1600 and signal conditioning components 1602 for, for example, amplifying signals and converting analogue signals to digital and digital signals to analogue to permit the control unit to receive and use signals from the sensors and output usable signals to the valves and other components controlled by the control unit. The control unit 728 may additionally comprise one or more random access memories (RAM) 1604 for storing data generated during operation of the internal combustion engine and circuitry 1606 for use in sampling incoming signals from one or more sensors to provide a usable input for the processor. The control unit 728 may additionally comprise one or more data storage components in the form of permanent memory 1606, which may be a read only memory (ROM), in which one or more control software portions 1608 are permanently stored. Of course, for some applications, no permanent memory is required. For example, the control unit may be connected with a master computer in which the control algorithms are stored and which uploads them to a RAM in the control unit at start up of the control unit. Another alternative would be for the control unit to be slaved to a master control unit or computer. Yet another alternative would be for the control to comprise one or more hard wired control circuits.

The internal combustion engines in the illustrated embodiments are provided with a conical body that is coaxially disposed in the engine cylinder. The conical body is arranged such that the cross-sectional area of the space defined between the conical body and the cylinder wall does not increase or decreases in the downstream direction of the cylinder. A flow modifying formation in the form of a spiralling wall supported by the conical body cooperates with the conical body and cylinder wall to define a spiralling passage so that the liquid output of the engine is forced to spiral towards the outlet valving. The spiralling motion induced improves the flow of the water towards the outlet valving, thereby reducing the losses due to drag and the control of the cross sectional area of the flowpath at least reduces the problem of cavitation of the liquid leading to the undesirable inclusion of gases in the outflowing liquid. Providing surface roughening on the parts, as described with reference to FIG. 28, can further reduce drag losses. It will be understood that at least some of these benefits can be obtained with other structures that provide a flowpath whose cross section area does not increase or decreases in the downstream direction of the flowpath. Additionally, other forms of flow modifying formation for imparting rotation of the flow with respect to the cylinder axis could be provided. For example, in the illustrated embodiments, vanes orientated to provide rotation to the flow could be provided between the cylinder wall and conical body. The vanes could be supported by either the cylinder wall or the conical body. Yet another alternative would be to provide spiralling ribs on one or both of the cylinder wall and conical body.

It will be understood that the embodiments illustrate a practical means for producing hydrogen within the engine to obtain improved power outputs as compared with conventional internal combustion engines. Having a working body in the form of a body of water rather than a metal piston provides a source of water that could dissociate by thermolysis when subjected to the relatively high temperatures and pressures experienced in the cylinder during combustion. However, it is currently believed that obtaining dissociation of the water by simply combusting a combustible hydrogen containing compound in the cylinder may not produce dissociation or, at least, will produce only very limited dissociation resulting in the production of very little hydrogen. This is in part because only limited amounts of the water will be heated sufficiently to dissociate and, although temperatures of 3500° C. may be obtained, the relatively slow burn obtained by combusting hydrocarbon fuels will results in dissipation of the heat.

It is believed that although introducing a water/vapour steam spray into the cylinder can be expected to reduce the temperature in the cylinder, benefits are obtained by having a considerably greater surface area water exposed to the heat of combustion. Furthermore, by providing a rich fuel air mixture for combustion, an excess of combustible hydrogen containing compound is made available in the cylinder making it possible to obtain steam reformation, which can occur at temperatures significantly lower than those required for water dissociation. This provides a supply of hydrogen in the combustion gases that is combusted in the cylinder. The relatively fast and fierce heat obtained from the combustion of the hydrogen allows less time for the heat to dissipate and provided the volume of water vapour/steam sprayed into the combustion gases is controlled prevent excessive cooling of the combustion gases, water dissociation can be obtained. This provides a significant volume of hydrogen and oxygen in the combusting gases that is itself combusted to generate an additional power output from the engine. A comparison of the curves in FIG. 13 suggests a threefold increase in useable power is obtainable.

It will be appreciated that the additional impetus provided to the outflowing liquid by the energy release obtained from combusting the hydrogen produced by steam reformation and/or water dissociation can be beneficial in that it is acting on a liquid that already has momentum. That is, the energy produced from the hydrogen combustion is not wasted in overcoming the inertia of a stationary body of water and instead provides additional impetus to a liquid that is already in motion so that the liquid outflow from the engine is potentially exposed to repeated bursts of energy rather than a single energy input.

It will be appreciated that the power output of the illustrated embodiments is an energised fluid and that the engines do not have a piston or rotor connected with an output shaft for outputting the energy generated by combustion. The energised fluid transports the energy imparted to it in the form of pressure and velocity (and some heat) when it is forced out of the chamber in which it is exposed to pressures generated by the combustion process. When in storage in the pressure reservoir(s), the energised fluid stores the imparted energy by pressurising a gas contained in the reservoir. When released from the storage reservoir, some of the energy stored as pressure is converted to a kinetic energy by driving, for example, an impellor, piston or a pump.

It will be appreciated that because the energy output from the cylinder(s) of the illustrated embodiments is transmitted in the form of an outflow of liquid driven by the expanding combustion gases, the reciprocating and/or rotating mechanically connected power output components (eg pistons connected to a crankshaft) found in a conventional reciprocating piston internal combustion engine are not needed. This provides the engine designer with greater freedom in matching the engine configuration to the required power output. For example, since the problems of engine balancing encountered with high speed reciprocating and rotating power transmission parts found in conventional internal combustion engines should not affect the internal combustion engine of the illustrated embodiments, it is envisaged that forming an internal combustion engine with an odd number of cylinders (for example three, five or seven) will not be any more problematical than having an even number.

Although not essential, because the output of the engine can be readily stored in an output storage device as a pressurised fluid, advantages as described below can be obtained. Purely for ease of reference, the output storage device(s) will be referred to as reservoir(s). It is to be understood, that the output storage device(s) can be of any suitable form and are not limited to the illustrated reservoir(s), which are given only as examples.

In the illustrated reservoirs, the liquid output from the engine cylinder flows through a gas containing region of the reservoir to get to a liquid storage region that contains the stored liquid output from the internal combustion chamber. The stored liquid pressurises the gas. That is, the pressure of the gas will vary according to the volume of stored liquid. Introducing the liquid into the chamber through a region that is maintained free of stored liquid reduces the flow impedance (resistance to entry of the liquid flow), thereby reducing energy losses and improving the efficiency of the internal combustion engine. When the reservoir is opened to output stored liquid, liquid is driven from the reservoir by the pressure stored in the gas.

In the illustrated embodiments, the reservoirs that receive the liquid outflow are located below the cylinders from which the liquid flows and the inlet for the liquid is at the top of the reservoir. Accordingly, since by virtue of gravity the gas will always be at the top of the reservoir, the liquid will enter the reservoir into and through the gas. It will be understood that it is not essential that the inlet is at the top of the reservoir. The inlet can be located anywhere below the top of the reservoir, but above the intended maximum height of the stored liquid or could be take the form of a conduit entering the reservoir into a region at least potentially occupied by stored liquid and having its outlet end located at a position above the intended maximum height of the liquid.

In order to ensure that under normal operating conditions the liquid enters' the reservoir through the gas rather than the stored liquid, operation of the chamber or chambers that output to the reservoir is controlled to ensure that the volume of liquid stored in the reservoir does not exceed a selected level, or height. In the illustrated embodiment, the control unit can make use of signals from the sensor used to detect pressure in the reservoir. As an alternative, or additionally, a dedicated sensor for detecting the volume of stored liquid could be used. For example a suitable switch forming part of circuit that is completed when the liquid level reaches a predetermined level could be used. Alternatively, an optical sensor or float switch might be used. Yet another alternative would be to have two sensors used in combination. A first of the sensors would be located at a position expected to be continuously occupied by stored liquid and would provide a reference signal. A second of the two sensors would be located at the level selected as the maximum level beyond which the reservoir should not be filled. In use, while the level of the stored liquid remained below the maximum level, the signal from the second sensor would be different to the reference signal. As soon as the stored liquid level reached the maximum level, the signal would change and substantially the same as the reference signal.

It may be desirable to provide baffles or the like in the reservoir(s) of engines that are intended to move while in use, such as engines fitted to motor vehicles, in order to ensure the liquid input region remains substantially free of liquid in the event the engine is operating while at an angle to the horizontal. For some applications it may be desirable for the baffles or the like to be movable such as to be able to adapt to different orientations of the engine.

The reservoir or reservoirs receiving the liquid outflow from the cylinder or cylinders may be two part reservoir(s) comprising a liquid containing reservoir and a gas containing reservoir, which is connected to the liquid containing reservoir by ducting and arranged such that the gas contained in the gas containing reservoir will expand and contract as the level of the liquid in the liquid containing reservoir changes. In order to prevent flooding of the gas containing reservoir, the reservoirs can be positioned at different heights so that the liquid has to flow upwardly from the liquid containing reservoir to the gas containing reservoir. In this arrangement, the liquid would preferably enter the output storage device via the gas containing reservoir, although, it could be made to enter through a suitably maintained gas containing region of the liquid containing reservoir.

As mentioned above, the reservoirs receiving the working fluid will contain a pocket of gas. It is envisaged that the gas should be low in oxygen content to reduce the risk of detonation within the reservoirs. The gas could, for example, be commercially available oxygen free nitrogen or even oxygen depleted exhaust gas.

It will be appreciated that because the energy output of the engine can be stored in the reservoir(s) so that it is available on demand, there is no need to provide the internal combustion engine with a flywheel, which represents a significant weight saving.

Because the output energy of the engine can be stored as a pressurised fluid in one or more storage reservoirs, it should be possible to operate the engine in such a way that the combustion chambers are cycled at a relatively low rate, for example, 20 cycles per minute. As compared with a conventional reciprocating piston internal combustion engine, this should make it possible to obtain better control of the various processes that occur during each cycle of the cylinder. Additionally, because the valves used to control the flow of fluids to and from the combustion chamber are able to operate independently of each other under the control of the control unit, it may not necessary to compromise on the timing of events to the same extent as is required by the structure of conventional reciprocating piston combustion engines. In the case of a multi-cylinder engine, the operation of the respective combustion chambers does not need to be synchronised to the same degree as in a conventional engine, which should make the engine more flexible and easier to control.

It will be appreciated that because the energy output of the internal combustion engine is stored in one or more reservoirs, power is available substantially instantaneously on demand. Accordingly, rapid acceleration from a standing start is possible simply by opening the valving connecting the reservoir(s) in which the energy is stored to the drive unit(s). The energy used to achieve this acceleration is then replaced while the vehicle is moving.

Another benefit of having the power output stored in a reservoir is that when the pressure in the reservoir is at a predetermined level and there is no significant load on the engine (for example if the vehicle is stopped in traffic), the engine does not need to be cycled and can, in effect, be turned off until such time as the pressure drops below that level or a predetermined lower level. It will be understood that in a similar situation in a multi cylinder engine some, or all, of the cylinders may be taken out of use until there is a requirement to restore the pressure of the fluid in the first reservoir. The same considerations apply if the vehicle is in motion and the momentum of the vehicle is such that the input drive requirement is reduced. Having an engine that can be selectively switched off in this way while still having power available on demand provides the opportunity to achieve significant fuel savings, particularly in the case of vehicles used mainly for the sort of stop/start driving typically encountered in an urban environment.

It will also be appreciated that because each operating cycle of the engine cylinder(s) includes admitting a volume of relatively cooler lower pressure liquid into the cylinder and greater use is made of the heat of combustion to produce useful work output, the need for cooling of the engine may be considerably reduced as compared with a conventional internal combustion engine. It is envisaged this will provide greater freedom to designers in selecting the materials from which the engine block is manufactured. It is envisaged it will also allow greater design freedom in allowing the use of thinner walls, as the resulting loss of thermal inertia is less likely to be a problem. This provides the possibility of making the engine much lighter than a conventional engine. It also provides the possibility of manufacturing the structure defining the combustion chamber from an engineering plastics providing the opportunity to manufacture parts using plastics moulding processes with the potential cost savings this gives. However, it should be noted that it might be necessary to line the combustion chamber with a relatively hard material to avoid problems with cavitation caused by movement of the high pressure high velocity liquid output from the engine. The walls of the combustion chamber exposed to the moving liquid may, for example, be protected by a ceramic liner or made from stainless steel or similar such material. If an engineering plastics is to be used, it is envisaged the surfaces exposed to the combustion gases will be roughened and/or provided with small recesses, indentations, pockets or the like to promote water retention so as to protect the plastics material from the heat of combustion. The surface roughening may, for example, take a form the same as or similar to that shown in FIG. 28.

As mentioned above, processes operating in the illustrated embodiments make use of heat that is wasted in a conventional internal combustion engine to provide additional power output and/or provide additional fuel in the form of hydrogen. It is envisaged that the cylinder and reservoirs receiving the liquid outflow will be made of materials having low thermal conductivity and/or insulated to minimise thermal losses to the surrounding atmosphere. The reservoirs in particular should be insulated to maintain the temperature of the pressurised gas they contain. One option envisaged is to provide the cylinder(s) and/or reservoirs with a vacuum jacket. In embodiments having an exhaust system that produces a vacuum, the vacuum jacket could be connected with a part of the exhaust system in which a vacuum is to found by ducting fitted with a one-way valve so that if the pressure in the insulating jacket rises above the vacuum in the exhaust system, the one-way valve opens to restore the vacuum. For some embodiments, it may be desirable to connect the insulating jacket(s) with a vacuum reservoir rather than directly to the exhaust system.

The combination of the weight savings made possible by the absence of heavy metal components such as a crankshaft and flywheel and/or having a lighter engine construction as a result of the cooling effect obtained by the introduction of the relatively cooler working fluid at the start of each combustion cycle, provide the potential to design an internal combustion engine that is significantly lighter than a conventional reciprocating piston internal combustion engine having an equivalent power output. While such weight savings may not be significant in cases in which the engine is used in situ, they can provide significant benefits in terms of energy efficiency when the engine is used in vehicles and other applications that require that the engine move while in use. It will be appreciated that such cases any weight saving should be beneficial as a portion of the engine's output must inevitably be used in accelerating and propelling the engine's own weight.

It will be understood that the absence of complex mechanisms comprising moving parts that must be precision machined should reduce manufacturing costs. In applications to motor vehicles, further savings may be made in terms of cost and weight since it is not necessary to have a clutch, flywheel, gearbox or differential.

In the illustrated embodiments, the second fluid mass comprises water or is at least predominantly water. It will be appreciated that if the second fluid mass is predominantly water, for some environments, it will be necessary to include additives to prevent freezing of the water when the engine is not in use. In embodiments in which the first fluid mass makes direct contact with the second fluid mass, some of the fuel will be absorbed by the second fluid mass and so, when an alcohol based fuel such as ethanol is used, there will be a constant 'anti freeze top up'. It will also be appreciated that it may be desirable to add suitable additives to the water to improve the efficiency of the thermal processes and/or inhibit corrosion. It is envisaged that when the second fluid mass comprises water, it will be better to use distilled water.

It is also envisaged that for some embodiments, it may be desirable to use a fluid other than water to form the second fluid mass, or working fluid.

Embodiments have been described in which one or more spark plugs are used as combustion initiators. It will be understood that other forms of combustion initiator can be used. For example a glow plug or hot wire could be used instead of a spark plug. Another alternative would be to mount a metallic object, for example a metal mesh, in the combustion chamber at which combustion is to be initiated and provide a microwave source targeted at the metal object.

Particularly for embodiments that are compression ignition engines, it may be desirable to provide the engine cylinder(s) with an associated chamber (not shown) that opens into the main cylinder space and into which the fuel is injected. Such a chamber can be configured to generate a swirl in the compressed first fluid mass that will aid the mixing of the first fluid mass and incoming fuel so as to improve the efficiency of the combustion process.

It will be appreciated that while for many applications it may be convenient to use a temperature sensor such as a thermocouple or optical temperature to provide indications of the changing pressure conditions in the locations at which the pressure needs to be monitored, a pressure sensor or other sensor capable of providing signals indicative of the pressure in the cylinder can be used instead. Such sensors include fibre optic sensors.

It will be understood that in applications to motor vehicles and other forms of transportation, the output from the engine may be used to power an electricity generator that would supply electricity to one or more electric motors used to power the wheels or the like of the transportation apparatus. In applications to forms of transportation that run on wheels, instead of using the output to turn an output shaft connected to the driven wheels, the driven wheels may be provided with a turbine like structure which receives the working fluid output from the engine.

It will be appreciated that the illustrations of the embodiments are schematics and so do not show the true construction of the internal combustion engine. In general it is envisaged that the ducting systems along which the energised second fluid flows from and back to the engine cylinder(s) will, insofar as this is possible, be formed by straight pipe runs or gentle curves to minimise energy losses caused by resistance to flow.

For ease of description, the engine cylinder(s) of the illustrated embodiments have been described as having one of each valve and one sensor for providing signals indicative of the pressure at each location at which a pressure reading is required. It will be appreciated that multiple valves and/or sensors may be used to provide desired performance levels and/or protection against failure of a single valve or sensor. Thus, for example, there may be twin air intake and/or twin exhaust valves or multiple sensors.

It will be appreciated that in the illustrated embodiments, the timing of the combustion event is not as critical as in conventional reciprocating piston internal combustion engines. For example, if there is pre-ignition as a consequence of varying octane levels in the fuel, the rapid pressure increase in the engine cylinder(s) as combustion occurs will still cause the output valving to open allowing the liquid outflow to be driven from the cylinder(s) into the first reservoir in the same way as it would following a normal combustion event. Thus the potential damage to engine components and power losses that typically result when there is pre-ignition in a conventional reciprocating piston internal combustion engine are avoided, or at least reduced. This makes the illustrated engines particularly suitable for use with fuels that do not exhibit the same consistency of quality as the commonly used petroleum based fuels and, for example, makes the engines particularly suitable for use with alcohol based fuels such as ethanol, which can be produced from renewable sources.

It will be appreciated that in the illustrated embodiments the liquid output of cylinder is recycled in what is essentially a closed circuit. However, there will be losses due to evaporation, leakage and imperfect condensation of the water vapour in the exhaust gases. It is, therefore, envisaged that a small water reservoir may be provided from which top ups can be made. Various mechanisms may be provided for providing the top up. For example, the level in the first reservoir at start up may be sensed and if the level is found to be insufficient, a top up flow provided from the reservoir. Alternatively, top ups could be made by periodic injection directly into the cylinder(s) from the reservoir 110.

In the illustrated embodiments, the fuel is injected directly into the first fluid mass, which in the embodiments mainly comprises air. This is not essential. The fuel could instead be metered into an air flow upstream of the cylinder and delivered into the cylinder already mixed with the air.

Various valves associated with the internal combustion engines of the illustrated embodiments are described as being normally closed solenoid actuated valves. It will be understood that other forms of electrically actuated valve could be used instead of one or more of the described solenoid actuated valves. It will also be appreciated that the valves could be hydraulically or pneumatically actuated.

In the illustrated embodiments, the output valving from the engine cylinder(s) comprises a one way valve responsive to the pressure balance acting on it. This is not essential. Instead, for example, an electrically actuable valve, such as a solenoid valve could be used. The pressure increase in the cylinder following the combustion event will be so large that it will be easily detected, for example by a temperature sensor such as the sensor 44 shown in FIG. 1, allowing the solenoid valve to be signalled to open and release the energised fluid into the reservoir. In an internal combustion engine in which the combustion event is triggered by operation of an initiating device such as a spark plug, the opening of an electrically actuable output valve can be timed from the actuation of the initiating device.

Many of the processes operating in the illustrated embodiments are described as being initiated in response to sensed temperature/pressure in parts of the respective engines. This may be desirable when the engine is required to function efficiently despite varying ambient operating conditions and/or variable loading. However, many of the control events could be initiated at set time intervals. Control procedures based on timed intervals are potentially simpler and may applicable to static engines (which could be housed in a building) and/or engines that are not subjected to significant changes in loading, or at least not dynamically varying loading.

In the description of the illustrated embodiments, the control of processes in the engine is described as based on current sensed signals and readings. It will be appreciated that many control strategies can be used. For example, control of one or more of the processes could be based on one or more historical signals and readings and data produced by processing such signals and readings.

It will be appreciated that the provision of a spiralling flow path for the output fluid from the cylinder as shown in the embodiments is not essential. The cylinder(s) of the internal combustion engine may be an empty volume so that the output fluid is simply driven straight towards the outlet by the expanding combustion gases.

It will be understood that for some embodiments, it may be desirable to have a free floating separating member disposed between the combustion gases and the working fluid (liquid). It is envisaged that such a separating member, which may be made of any suitable material and is free to reciprocate in the cylinder in response to changes in the respective pressures acting on it, will assist in providing an even transmission of energy from the combustion gases to the liquid across substantially the whole width of the cylinder. Such a separating member may also be desirable to limit contamination of the liquid by the fuel and/or products of combustion of the first fluid mass. It will be appreciated that the separating member can be completely free to move and there is no need to provide sealing between the separating member and the cylinder wall since, in effect, the sealing is provided by the liquid.

It will be understood that engine manufacturers may supply the engine already filled with the working fluid (liquid) or the working fluid may be added later by a vehicle manufacturer or, for non-vehicular applications, the manufacturer of the equipment with which the internal combustion engine is supplied, or by party who sells the engine or equipment in which it is included, or the end user.

Modifications to the internal combustion engine 10 are shown in FIGS. 14 and 15 and modifications to the internal combustion engine 710 are described with reference to FIGS. 23 to 27. It will be appreciated that some or all of the modifications to the internal combustion engine 10 may be applied to the internal combustion engine 710 and similarly some or all of the modifications to the internal combustion engine 710 may be applied to the internal combustion engine 10.

It will be understood that the condition and proportions of the fluids as shown in the drawings are for illustration purposes only and do not necessarily reflect what will apply in a working engine. It will also be understood that the orientation of the internal combustion engines shown in the drawings and the references to 'up' and 'down' made in the description are put forth as such by way of example and for ease of understanding and are not to be taken as limiting. For example, as viewed in FIGS. 1 and 17, the combustion chamber could be disposed in a non-vertical, and even horizontal, orientation. This could be achieved by configuring the combustion chamber with two distinct regions in open flow communication with one another, but arranged such that the air-fuel mixture can be combusted without contamination by the fluid that is to be energised and the pressure wave generated by combustion can act on the fluid to be energised such as to energise that fluid.

It will be understood that although the internal combustion engines of the illustrated embodiments have been described in use in motor vehicles, the engine is not limited to such use. The internal combustion engine could, for example, also be used to power boats, electricity generator sets, portable machines (for example compressors), lawn mowers and tools.

The invention claimed is:

1. An internal combustion engine comprising:
   a chamber;
   inlet valving operable to admit constituents of a combustible mixture into said chamber for combustion of said combustible mixture in said chamber to provide an expanding gaseous mass in said chamber;

outlet valving operable to release an outflow of a liquid contained in said chamber from said chamber under an influence of said expanding gaseous mass as an energy output of said chamber; and a fluid holder that is housed in said chamber, said fluid holder being disposed in a region of said chamber in which combustion of said combustible mixture takes place such that an aqueous fluid held by said fluid holder is disposed within said expanding gaseous mass so that said aqueous fluid is heated in a process to provide hydrogen that is combusted in said chamber and there being at least one flowpath past said fluid holder for said expanding gaseous mass to permit said expanding gaseous mass to act on said liquid.

2. An internal combustion engine as claimed in claim 1, wherein said fluid holder comprises a plurality of spaced apart fluid retaining members supported by support members such as to define said at least one flowpath between said fluid receiving members.

3. An internal combustion engine as claimed in claim 2, wherein said fluid retaining members comprise at least one fluid retaining recess for retaining said aqueous fluid.

4. An internal combustion engine as claimed claim 1, comprising input valving for admitting said aqueous fluid into said chamber and a controller for said input valving, said controller controlling said input valving such that said aqueous fluid is admitted to said chamber prior to completion of a compression process in said chamber by which compression process at least one constituent of said combustible mixture is compressed prior to combustion of said combustible mixture.

5. An internal combustion engine as claimed in claim 4, comprising at least one optical sensor for providing signals indicative of conditions in said chamber, said controller controlling said input valving at least in part based on said signals provided by said at least one sensor.

6. An internal combustion engine as claimed in claim 5, wherein said at least one optical sensor comprises at least one optical temperature sensor.

7. An internal combustion engine as claimed in claim 1, comprising a device disposed upstream of said chamber and operable to add controlled amounts of a hydrogen containing compound to said aqueous fluid to promote a steam reformation process to separate hydrogen from said hydrogen containing compound to provide at least a portion of said hydrogen that is combusted in said chamber.

8. An internal combustion engine as claimed in claim 7, comprising a catalyst disposed upstream of said chamber over which said aqueous flow is flowed for releasing hydrogen from said hydrogen containing compound.

9. An internal combustion engine as claimed in claim 1, comprising a controller operable to control said inlet valving such that said combustible mixture is fuel rich for promoting a steam reformation process to produce at least a portion of said hydrogen that is combusted in said chamber.

10. An internal combustion engine as claimed in claim 1, wherein said chamber includes an internally defined flowpath for said liquid outflow that winds about a centreline of said chamber, said flowpath having a cross section area that remains substantially constant or decreases in a downstream direction of said flowpath.

11. A method of operating an internal combustion engine, said method comprising:

combusting a combustible mixture in a chamber to provide an expanding gaseous mass for driving a liquid contained in said chamber from said chamber as an energy output of said chamber; and providing an aqueous fluid on at least one fluid holder that is housed in said chamber and located in said chamber such that at least one flowpath is defined in said chamber through which said expanding gaseous mass can flow past said at least one fluid holder to drive said liquid from said chamber and at a position in which said at least one fluid holder will be within said expanding gaseous mass so that said aqueous fluid is heated in a process to provide hydrogen that is combusted in said expanding gaseous mass.

12. A method of operating an internal combustion engine as claimed in claim 11, wherein said fluid holder comprises a plurality of spaced apart fluid retaining members and said aqueous fluid is provided on said retaining members.

13. A method of operating an internal combustion engine as claimed in claim 11, comprising adding a hydrogen containing compound to said aqueous fluid upstream of said chamber to provide at least a portion of a sufficient volume of hydrogen containing compound in said combustible mixture for promoting a steam reformation process to provide said hydrogen for combustion in said combustible mixture.

14. A method of operating an internal combustion engine as claimed in claim 13, comprising flowing said aqueous fluid over a catalyst disposed upstream of said chamber to release hydrogen from said hydrogen containing compound.

15. A method of operating an internal combustion engine as claimed in claim 13, wherein said hydrogen containing compound comprises hydrogen and carbon.

16. A method of operating an internal combustion engine as claimed in claim 13, wherein said hydrogen containing compound is a combustible compound.

17. A method of operating an internal combustion engine as claimed in claim 11, comprising forming said combustible mixture with a fuel oxidant ratio greater than a stoichiometric ratio to provide at least a portion of a sufficient volume of hydrogen containing compound in said combustible mixture for promoting a steam reformation process by which hydrogen is separated from said hydrogen containing compound to provide said hydrogen for combustion in said expanding gaseous mass.

18. A method of operating an internal combustion engine as claimed in claim 11, comprising heating said aqueous fluid upstream of said chamber.

19. A method of operating an internal combustion engine as claimed in claim 18, comprising heating said aqueous fluid with heat from products of combustion exhausted from said internal combustion engine.

20. A method of operating an internal combustion engine as claimed in claim 11, comprising receiving said liquid driven from said chamber in an output storage device through a region of said output storage device that is maintained free of liquid.

21. A method of operating an internal combustion engine as claimed in claim 20, comprising supplying at least a portion of said aqueous fluid from said output storage device.

22. A method of operating an internal combustion engine as claimed in claim 11, comprising causing said liquid to flow along a spiralling internal flow path in said chamber which flowpath has a cross section that is substantially constant or decreases in a downstream direction thereof.

23. A method of operating an internal combustion engine as claimed in claim 11, comprising obtaining optical indications of conditions in said chamber and controlling operation of said chamber at least in part based on said optical indications.

\* \* \* \* \*